US006221140B1

(12) United States Patent
Kobayashi et al.

(10) Patent No.: US 6,221,140 B1
(45) Date of Patent: Apr. 24, 2001

(54) INK JET INK CONTAINING AN ORGANIC METAL COMPLEX

(75) Inventors: Shin Kobayashi, Kawasaki; Tsuyoshi Furuse, Atsugi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,470

(22) Filed: Jul. 9, 1999

Related U.S. Application Data

(62) Division of application No. 08/730,586, filed on Oct. 15, 1996, now Pat. No. 6,113,448.

(30) Foreign Application Priority Data

Oct. 13, 1995 (JP) ........ 7-290644
Jun. 14, 1996 (JP) ........ 8-174384
Oct. 11, 1996 (JP) ........ 8-287347

(51) Int. Cl.[7] ........ C09D 11/00
(52) U.S. Cl. ........ 106/31.43; 106/31.75
(58) Field of Search ........ 106/31.43, 31.75, 106/31.58, 31.86

(56) References Cited

U.S. PATENT DOCUMENTS

| | | | | |
|---|---|---|---|---|
| 3,611,077 | | 10/1971 | Smith | 315/94 |
| 4,632,703 | * | 12/1986 | Kioke et al. | 106/22 |
| 5,220,347 | | 6/1993 | Fukushima et al. | 346/1.1 |
| 5,541,633 | * | 7/1996 | Winnik et al. | 347/98 |
| 5,563,644 | * | 10/1996 | Isganitis et al. | 347/102 |

FOREIGN PATENT DOCUMENTS

| | | |
|---|---|---|
| 0 605 881 | 7/1994 | (EP) . |
| 0 660 357 A1 | 6/1995 | (EP) . |
| 0 717 428 A2 | 6/1996 | (EP) . |
| 61-296649 | 12/1986 | (JP) . |
| 2-223141 | 9/1990 | (JP) . |

OTHER PUBLICATIONS

Dyke, et al., "Field Emission", Advances in Electronics and Electron Physics, vol. VIII, pp. 89–185, 1956.
Spindt, et al., "Physical Properties of Thin–Film Field Emission Cathodes with Molybdenum Cones", Journal of Appl. Phys., vol. 47, No. 12, pp. 5248–5263, 1976.
Mead, "Operation of Tunnel–Emission Devices", Journal of Appl. Phys., vol. 32, pp. 646–652, 1961.
Elinson, et al., "The Emission of Hot Electrons and the Field Emission of Electrons from Tin Oxide", Radio Engineering and Electronic Phys., pp. 1290–1296, 1965.
Dittmer, "Electrical Conduction and Electron Emission of Discontinuous Thin Films", Thin Solid Films, vol. 9, pp. 317–328, 1972.
Hartwell, et al., "Strong Electron Emission from Patterned Tin–Indium Oxide Thin Films", Internat'l Electron Devices Meeting, pp. 519–521, 1975.
Araki, et al., "Electroforming and Electron Emission of Carbon Thin Films", Journal of the Vacuum Society of Japan, vol. 26, No. 9, pp. 22–29, 1981.
Korean Official Letter/Search Report (Dated Sep. 30, 1999).

* cited by examiner

*Primary Examiner*—Mark L. Bell
*Assistant Examiner*—Veronica F. Faison
(74) *Attorney, Agent, or Firm*—Fitzpatrick, Cella, Harper & Scinto

(57) ABSTRACT

An ink jet ink containing an organic metal complex compound including a metal element and an amino acid group, wherein the metal element is coordinated by the amino acid group.

31 Claims, 13 Drawing Sheets

INK JET INK CONTAINING AN ORGANIC METAL COMPLEX

This is a division of application Ser. No. 08/730,586, filed Oct. 15, 1996 now U.S. Pat. No. 6,113,448.

BACKGROUND OF THE INVENTION

1. Field of the Invention

The present invention relates to an organic-metal-compound-containing solution used in manufacturing an electron-emitting device, and to methods of manufacturing an electron-emitting device, an electron source, and an image forming apparatus using the organic-metal-compound-containing solution and, more particularly, to the manufacturing method using an ink-jet method and the solution used in the manufacturing method.

2. Related Background Art

As conventional electron-emitting devices, two types of electron-emitting devices, i.e., a thermionic emission device and a cold-cathode emission device, are known. As the cold-cathode emission device, a field emission type device (to be referred to as "FE type" hereinafter), a metal/insulating layer/metal type (to be referred to as "MIM type" hereinafter) emission device, and a surface conduction type electron-emitting device are known. For example, as a FE type device, an device disclosed in W. P. Dyke & W. W. Dolan, "Field Emission", Advances in Electronics and Physics, 8, 89 (1956), C. A. Spindt, "PHYSICAL Properties of Thin-Film Field Emission Cathodes with Molybdenum Cones", J. Appl. Phys., 47, 5248 (1976), or the like is known.

As an MIM type emission device, device disclosed in C. A. Mead, "Operation of Tunnel-Emission Devices", J. Appl. Phys., 32, 646 (1961) or the like is known.

As a surface conduction type electron-emitting device, a device disclosed in M. I. Elinson, "The Emission of Hot Electrons and the Field Emission of Electrons from Tin Oxide," Radio Eng. and Electron Pys., 10, 1290 (1965) or the like is known.

A surface conduction type electron-emitting device uses a phenomenon in which electron emission occurs by causing a current to flow into a small thin film formed on a substrate in a direction parallel to the film plane. As the surface conduction type electron-emitting device, the above electron-emitting device using an $SnO_2$ thin film and obtained by Elinson, an electron-emitting device using an Au thin film [G. Dittmer, "Electrical Conduction and Electron Emission of Discontinuous Thin Films," Thin Solid Films, 9, 317 (1972)], an electron-emitting device using an $In_2O_3/SnO_2$ thin film [M. Hartwell and C. G. Fonstad, "Strong Electron Emission from Patterned Tin-Indium Oxide Thin Films," IEEE Trans. ED Conf., 519 (1975)], an electron-emitting device using a carbon thin film [Hisashi Araki et al., "Electroforming and Electron Emission of Carbon Thin Films," Journal of the Vacuum Society of Japan, Vol. 26, 1, 22 (1983), or the like has been reported.

As a schematic device arrangement of the above surface conduction type electron-emitting devices, the device arrangement obtained by M. Hartwell will be described below with reference to FIG. 7. Referring to FIG. 7, reference numeral 1 denotes a substrate. Reference numeral 4 denotes an electroconductive thin film consisting of a metal oxide thin film or the like formed by sputtering in an H-shaped pattern. The electroconductive thin film 4 is subjected to a current conduction treatment called energization forming to form an electron emission portion 5. The length L and width W' of the device in FIG. 7 are set to about 0.5 mm to 1 mm and about 0.1 mm, respectively.

In the above conventional surface conduction type electron-emitting device, before electron emission is performed, the electroconductive thin film 4 is generally subjected to a current conduction treatment called energization forming to form the electron emission portion 5. More specifically, in the energization forming, a DC voltage or a voltage which very slowly increases, e.g., about 1 V/min., is applied across both the ends of the electroconductive thin film 4 to energize the electroconductive thin film 4, and the electroconductive thin film 4 is locally broken, deformed, or deteriorated to form the electron emission portion 5 which is in an electrically high resistance state. In the electron emission portion 5, fissures are formed in a part of the electroconductive thin film 4, and electron emission occurs from a portion near the fissures. In the surface conduction type electron-emitting device which has been subjected to the energization forming treatment, a voltage is applied to the electroconductive thin film 4 to cause a current to flow into the device, thereby causing the electron emission portion 5 to emit electrons.

As a method of forming the electroconductive thin film, a method of directly forming an electroconductive material on a substrate by thin film deposition such as vacuum evaporation or sputtering is known. As another method, a method of coating a solution of an organic metal compound or the like on a substrate and heating to decompose it into a metal or a metal oxide is known. According to these methods, since a vacuum apparatus for film formation is not required, advantages in production, such as a reduction in manufacturing cost, can be obtained.

As described above, to apply an organic metal compound solution on a substrate to form an electroconductive film, the following patterning method is used. That is, after a mask having an opening having a predetermined pattern is formed on the substrate, the organic metal compound solution is coated on the substrate by dipping, spin-coating, spray-coating, or the like, and the coated film is heated and decomposed to obtain a metal or a metal oxide. Thereafter, the mask is removed to obtain an electroconductive film having a predetermined shape. However, if the solution coated on the entire surface of the substrate need not be patterned, then when an electron source in which a large number of devices are arranged on a large substrate is to be manufactured, advantages in manufacturing can be obtained.

SUMMARY OF THE INVENTION

It is an object of the present invention to provide a method of manufacturing an electron-emitting device which can be manufactured in simple processes at a low cost, and a method of manufacturing an electron source and an image forming apparatus using the electron-emitting device.

It is another object of the present invention to provide a method of manufacturing an electron-emitting device having good mass-production properties and an increased yield, and a method of manufacturing an electron source and an image forming apparatus using the electron-emitting device.

It is still another object of the present invention to provide a method of manufacturing an electron-emitting device having good electron emission characteristics, and a method of manufacturing an electron source and an image forming apparatus using the electron-emitting device.

It is still another object of the present invention to provide a method of manufacturing an electron-emitting device in which a solution containing water as a main component and an organic metal compound is applied as a droplet by a (bubble jet) BJ device to form an electroconductive film for the electron-emitting device, and a method of manufacturing an electron source and image forming apparatus using the electron-emitting device.

It is still another object of the present invention to provide a manufacturing method which suppresses the pattern of an obtained electroconductive film from being different from a desired one due to deformation of the pattern of a droplet after a solution is applied or a difference between wettabilities of the solution to a substrate surface and an electron surface in the above manufacturing method.

The present invention which has been made to achieve the above objects provides a method of manufacturing an electron-emitting device including an electroconductive film having an electron emission portion and arranged between electrodes, characterized in that the step of forming the electroconductive film has the step of applying a solution containing an organic metal compound including a metal element and an amino acid group and water to a portion between electrodes arranged on a substrate by using an ink-jet method which gives heat to the solution to discharge the solution, drying the applied solution, and then decomposing the compound.

According to the present invention, there is provided a method of manufacturing an electron source including an electron-emitting device having an electroconductive film having an electron emission portion and formed between electrodes, and voltage applying means for applying a voltage to the electron-emitting device, characterized in that the electron-emitting device is manufactured by the above method.

According to the present invention, there is provided a method of manufacturing an image forming apparatus including an electron source comprising (1) an electron-emitting device having an electroconductive film containing an electron emission portion and arranged between electrodes, (2) voltage applying means for applying a voltage to the electron-emitting device, and (3) a light-emitting member which receives electrons emitted from the electron source to emit light, characterized in that the electron-emitting device is manufactured by the above method.

DESCRIPTION OF THE PREFERRED EMBODIMENTS

Figure 1A:
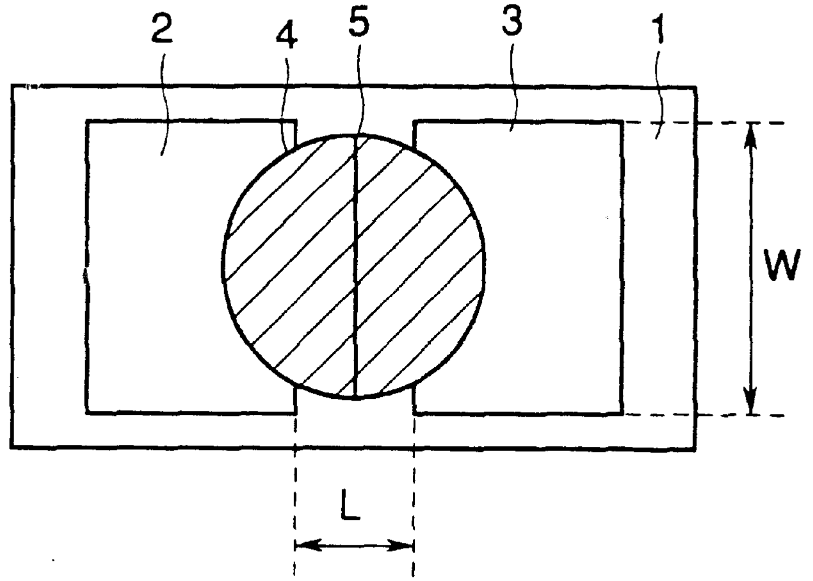
FIGS. 1A and 1B are schematic plan and sectional views showing the arrangement of a surface conduction type electron-emitting device to which the present invention can be applied.

The present invention is made on the basis of the following knowledge.

As a method of obtaining an electroconductive film having a desired shape in manufacturing an electron-emitting device, the following method is also known. That is, an organic metal compound solution is applied as a droplet onto a substrate by an ink-jet device to form a desired shape, and the organic metal compound solution is heated and decomposed to form an electroconductive film. According to the method using the ink-jet device, the solution coated on the entire surface of the substrate need not be patterned, and advantages in manufacturing can be obtained for an electron source in which a large number of electron-emitting devices are formed on a large substrate.

As one method for the ink-jet device, a method in which a solution is heated by a heater to rapidly bubble the solution, thereby discharging the solution as a droplet from a nozzle (to be referred to as bubble-jet: BJ) is known. When this method is to be used, water is desirably used as the main component of the solution. Therefore, an organic metal compound used as a solution used in a manufacturing method in which an electroconductive film of an electron-emitting device is formed by the BJ scheme must be dissolved in water to some extent.

When a droplet is to be generated by using the BJ scheme, a heater of a BJ device is repetitively heated to a high temperature. For this reason, a phenomenon that deposits (to be referred to as "burnt matter" hereinafter) caused by the organic metal compound is generated on the heater surface is found. However, when deposition of the burnt matter increases, a droplet discharge state gradually changes. With this change, the state of the formed electroconductive film changes, and the characteristics of electron-emitting devices to be formed may change as the electron-emitting devices are continuously manufactured. In addition, a burnt matter is partially attached to the substrate together with a droplet, a part of an electroconductive film to be formed is different from another part in shape or resistance, and electron-emitting devices respectively having different characteristics may be formed. The discharge port of the BJ head may become clogged, and a droplet may not be normally discharged. Since these phenomena occur, the generation of burnt matter should preferably be suppressed as much as possible.

When a solution is to be bubbled in the BJ device, the surface temperature of a heater becomes about 400° C. When the thermal decomposition temperature (temperature at which a bond between a metal atom and an organic component is cut) of an organic metal compound contained in the solution is sufficiently higher than the surface temperature, the above-mentioned burnt matter is not generated. However, after a droplet is applied on a substrate, the solution must be heated and decomposed to generate a metal or a metal oxide. The upper limit of a temperature to which the substrate can be heated is determined by the heat resistance temperatures of the materials of the substrate, an electrode, and a wiring, and is normally set to about 400° C. A temperature at which the substrate is actually heated is desirably set to be sufficiently lower than 400° C. For this reason, the above method in which the decomposition temperature is set to be higher than the heater surface temperature cannot be employed.

Therefore, an organic metal compound which can be thermally decomposed at a temperature of 300 and several tens ° C. or less and only slightly generates the above-mentioned burnt matter has been demanded.

Furthermore, a solution containing the organic metal compound is applied as a droplet into a desired pattern, the solution is dried and/or subjected to a heat treatment to form an electroconductive film having a desired shape. The droplet applied during this operation must keep its original pattern. However, after the droplet is applied to a substrate, when water is gradually evaporated, the original pattern may not be able to be kept. In order to avoid this change in shape, the viscosity of the solution must be regulated within a proper range without adversely affecting formation of the electroconductive film.

Although the above droplet pattern is formed over a pair of device electrodes and a substrate surface therebetween, in order to form a desired pattern, the wettability of the solution to the device electrode surface must be set to be equal to the wettability of the solution to the substrate surface.

The present invention is based on the above knowledge. In the present invention, in formation of an electroconductive film by the BJ scheme, an organic metal compound having an amino acid is used. More preferably, an organic metal compound in which the amino acid group contains a hydroxyl group or/and a heterocycle is used. Of these organic metal compounds, an organic metal compound containing an amino acid group having a heterocycle is most preferable.

The amino acid group having a hydroxyl group is an atomic group obtained by formally removing hydrogen from a compound having an amino group (normally, —$NH_2$), a carboxyl group (—COOH), and a hydroxyl group (—OH) in a molecule. As a concrete example of the compound, a serine, threonine, thyrosin, DOPA (3-(3,4-dihydroxyphenyl)-alanine), or the like is available. In particular, the serine or threonine is preferably used.

The amino acid group having a heterocycle is an atomic group obtained by formally removing hydrogen from a compound in which an amino group, a carboxyl group, and carbon atoms are cyclically connected to each other in a molecule, and the cycle has a portion containing at least one hetero atom. As a concrete example of the compound, a proline, a hydroxyproline, a pipecolic acid, a tryptophan, a histidine, a tetrahydrofuroic acid, or the like is available. In particular, the proline, hydroxyproline, or pipecolic acid is preferably used.

For the metal element contained in the organic metal compound used in the present invention, a platinum group element such as platinum, palladium, or ruthenium, or gold, silver, copper, chromium, tantalum, iron, tungsten, lead, zinc, tin, or the like is used. In particular, the platinum group element, especially palladium, is preferably used.

As a combination between an amino acid group and a metal element which constitute the organic metal compound, a combination between palladium serving as a metal element and one of a proline, a hydroxyproline, serine, threonine, and a pipecolic acid as an amino acid group is preferably used, a combination between palladium and one of a proline, a hydroxyproline, and a pipecolic acid is more preferably used, and a combination between palladium and a proline is still more preferably used.

Although the reason why the formation of burnt matter is suppressed when a solution containing the above organic metal compound is used has not been sufficiently understood, the following reason is estimated.

More specifically, the organic metal compound has a decomposition temperature of 200° C. or higher which is relatively higher than that of a conventional compound, and generates a lesser amount of decomposition product caused by heat from a heater. In addition, even if the organic metal compound is decomposed by heat from the heater, when the decomposition product is easily dissolved in water, the decomposition product is not deposited as a burnt matter.

The atomic group containing a hydroxyl group and a heterocycle has a high bonding strength, and includes bonds which cannot be easily cut in thermal decomposition. For this reason, only predetermined bond positions are cut in thermal decomposition, and the types of the decomposition products generated by the decomposition are limited. When the decomposition products can be dissolved in water, no burnt matter is generated. Therefore, when materials are properly selected such that several main decomposition products can be solved in water, no burnt matter is generated. In particular, the bonding strength of a heterocycle is high, and it is understood that the heterocycle is not easily cut. For this reason, a compound containing the heterocycle is desirably used.

On the other hand, a compound free from such an atomic group includes a large number of bonds which are easily cut. For this reason, various types of decomposition products are generated depending on a manner of cutting the bonds of the compound in decomposition. The probability that the various types of decomposition products are not solved in water is high, and materials which generate no burnt matter cannot be easily found.

Although the metal concentration range of the above metal composition slightly changes depending on the type of metal compound to be used, the metal concentration range is generally set to be the range of 0.1 wt % to 2.0 wt %. When the metal concentration is excessively low, a large number of droplets of the above solution must be applied to a substrate to apply a desired amount of metal to the substrate. As a result, a time required to apply the droplets is prolonged, and an excessively large reservoir is formed on the substrate. For this reason, an object that a metal is applied to only a desired position cannot be achieved. In contrast to this, when the metal concentration of the solution is excessively high, a droplet applied to a substrate is made considerably ununiform in the later drying or heating treatment. As a result, the electroconductive film of an electron-emitting device easily becomes ununiform, thereby degrading the characteristics of the electron-emitting device.

The metal composition used in the present invention also preferably contains partially esterified polyvinyl alcohol to preferably form a pattern. The partially esterified polyvinyl alcohol described here is a polymer containing a vinyl alcohol unit and a vinyl ester unit. For example, a polymer obtained by partially esterifying a "completely" hydrolyzed polyvinyl alcohol which is generally available by carboxylic anhydride such as acetic anhydride or carboxylic anhydride such as acetyl chloride is a partially esterified polyvinyl alcohol. In a normal treatment of producing polyvinyl alcohol, i.e., in a process of producing a polyvinyl alcohol by hydrolyzing polyvinyl acetate, polyvinyl acetate is incompletely hydrolyzed such that hydrolysis of polyvinyl acetate is stopped in the middle of reaction, thereby obtaining partially hydrolyzed polyvinyl alcohol. This partially hydrolyzed polyvinyl alcohol is also used as a partially esterified polyvinyl alcohol. In consideration of availability and cost, the partially hydrolyzed polyvinyl alcohol is most effectively used as a partially esterified polyvinyl alcohol used in the present invention.

As an acyl group constituting the ester, in addition to an acetyl group described above, an acyl group such as a propionyl group, a butyryl group, or a stearyl group produced from an aliphatic acetyl group carbonic acid is used. The number of carbon atoms in each of these acyl groups must be 2 or more.

The degree of esterification of the partially esterified polyvinyl alcohol is important. For example, a so-called "completely" hydrolyzed polyvinyl alcohol which is available, i.e., a polyvinyl acetate hydrolysate from which about 99% of acetyl groups are removed, is not properly used as partially esterified polyvinyl alcohol for a metal composition used in the present invention. In contrast to this, since completely esterified polyvinyl alcohol such as polyvinyl acetate is not substantially dissolved in water, it cannot be easily contained in the metal composition used in the present invention. The esterification rate of partially esterified polyvinyl alcohol which can be actually used in the present invention is preferably set within the range of 5 mol % to 25 mol %. In particular, the partially esterified polyvinyl alcohol is most effective when its esterification rate is set within the range of 8 mol % to 22 mol %. The esterification rate described here means the ratio of the number of bonded acyl groups to the number of all vinyl alcohol repetitive units of a polymer. This ratio can be determined by a means such as element analysis or infrared absorption analysis.

The degree of polymerization of the partially esterified polyvinyl alcohol is preferably set within the range of 400 to 2,000. When the degree of polymerization is lower than this range, the coating of a metal composition is not stably formed. When the degree of polymerization is higher than this range, the solution viscosity of the metal composition becomes high, and a problem is posed when the solution is used in the coating process, or the coating tends to increase in thickness. In formation of an electroconductive film of an electron emission portion having a proper thickness, partially esterified polyvinyl alcohol having a degree of polymerization of 450 or more and 1,200 or less is most preferably used.

The concentration of the partially esterified polyvinyl alcohol in the metal composition used in the present invention is properly set to 0.01% or more and 0.5% or less. When the concentration is lower than this concentration range, a sufficient effect cannot be obtained by the polymer addition. When the concentration is higher than this concentration range, a problem is posed in the coating step by an increase in viscosity of the metal composition. The polymer components are not completely decomposed in heating treatments, and an organic component may be left on the electron emission portion.

In addition, the metal composition used in the present invention preferably contains water-soluble polyhydric alcohol to making pattern forming capability preferable, to improve wettability, and the like. The polyhydric alcohol described here is a compound having a plurality of alcoholic hydroxyl groups in a molecule. In particular, polyhydric alcohol which has a carbon number of 2 to 4 and is in a liquid state at room temperature is used. More specifically, ethylene glycol, propylene glycol, 1,3-propanediol, 3-methoxy-1, 2-propanediol, 2-hydroxymethyl-1, 3-propanediol, dimethylene glycol, glycerine, 1,2,4-butanetriol, and or the like is effectively added to the metal composition of the present invention.

The polyhydric alcohol is preferably contained in the metal composition used in the present invention within the range of 0.05 wt % to 3 wt %, more preferably, the range of 0.2 wt % to 5 wt %. In this manner, when the concentration of the polyhydric alcohol is high, a drying rate of the metal composition coated on a substrate is undesirably low. When the concentration is lower then the above range, effects such as pattern forming capability and wettability are degraded.

The metal composition used in the present invention preferably contains water-soluble monohydric alcohol to adjust the drying rate of the metal composition. A water-soluble monohydric alcohol which can be used in the present invention is a water-soluble monohydric alcohol which has a carbon number of 1 to 4 and is in a liquid state at room temperature. More specifically, methanol, ethanol, propanol, 2-butanol, or the like is used.

The water-soluble monohydric alcohol is preferably added to the metal composition at a concentration of 5 wt % or more and 35 wt % or less. When the concentration is higher than this range, the solubility of the water-soluble organic metal compound decreases. In addition, a coating extends on a substrate when the solution is partially coated on the substrate and, it may be difficult to form the coating in only a desired area.

In the droplet applying process, a droplet need not be applied to the same position on a substrate only once, the droplet may be applied to the same position two or more times to apply a desired amount of metal composition onto the substrate. When a droplet is independently applied onto the substrate, a small coating having a circular shape or a shape similar thereto is generally formed. When a plurality of droplets are applied in such a manner that the application positions on the substrate are spaced apart from each other by distances smaller than the diameter of the circular shape, a continuous large coating having an arbitrary shape can be formed.

The metal composition applied onto the substrate by the BJ means is subjected to drying and heating treatments to form a conductive inorganic fine particle film. In this manner, an inorganic fine particle film for electron emission is formed on the substrate. The fine particle film described here is a film obtained by gathering a plurality of fine particles, and also indicates not only a film in which fine particles are independently dispersed and arranged in a macroscopic manner, but also a film having a state in which fine particles are adjacent to each other or overlap (including an island shape). The particle diameter of the fine particle film indicates the diameter of each fine particle whose shape can be recognized in the above state.

As the drying treatment, a spontaneous drying treatment, an air-blow drying treatment, a heat drying treatment, or the like may be used. The substrate onto which the solution is applied can be dried by placing it in an electric dryer at 70°

C. to 130° C. for 30 seconds to 2 minutes. In the heating treatment, a heating means which is normally used may be used. Although the heating temperature must be set to be a sufficient temperature at which an organic metal compound is decomposed to produce inorganic fine particles, the temperature is preferably set to 150° C. or higher and 500° C. or lower. The heating treatment can be performed in a reducing gas atmosphere, an oxidizing gas atmosphere, an inert gas atmosphere, or a vacuum atmosphere. In the reducing or vacuum atmosphere, fine metal particles are often generated by thermally decomposing the organic metal compound. On the other hand, in the oxidizing gas atmosphere, fine particles of a metal oxide are often generated. However, the heating atmosphere and the oxidization state are not simply determined as described above. Even if the heating treatment is performed in the oxidizing atmosphere, metal oxide particles are generated at first by decomposing the organic metal compound. When the heating treatment continues, the metal may be oxidized to generate the fine particles of a metal oxide. When either a metal or a metal oxide is generated, and a fine particle film having conductivity is formed, the fine particle film can be used in the electron-emitting device. In order to simplify the heating device and reduce production costs, the heating treatment is excellently performed in an air atmosphere. An optimum heating time changes depending on the type of an organic metal compound to be used, a heating atmosphere, and a heating temperature. The heating time is normally set to about 2 to 40 minutes. Although the heating temperature may be constant, it may be changed depending on a predetermined program. The drying treatment and the heating treatment are not necessarily performed as different steps, these treatments may be continuously performed at once.

When a conductive inorganic fine particle film is formed on a substrate as described above, an electron-emitting device can be manufactured. More specifically, a method of manufacturing an electron source according to the present invention is a method of manufacturing an electron source comprising an electron-emitting device and a voltage application means for applying a voltage to the device, and is characterized in that the electron-emitting device is manufactured by the method described above.

A method of manufacturing an image forming apparatus according to the present invention is a method of manufacturing an image forming apparatus comprising an electron source having an electron-emitting device and a voltage application means for applying a voltage to the device, and a light-emission member which receives electrons emitted from the device to emit light, and is characterized in that the electron-emitting device is manufactured by the method described above.

A method of manufacturing an image forming apparatus according to the present invention is a method of manufacturing an image forming apparatus comprising an electron source having an electron-emitting device and a voltage application means for applying a voltage to the device, a light-emission member which receives electrons emitted from the device to emit light, and a drive circuit for controlling the voltage applied to the device by using an external signal, and is characterized in that the electron emitting device is manufactured by the method described above.

Embodiments of the present invention will be described below. The present invention is not limited to these embodiments, replacement of respective devices and a change in design can be effected if the objects of the present invention are achieved.

EXAMPLE 1

Two point three grams of proline and 20 ml of water were poured into a 100-ml eggplant-type flask to obtain an aqueous solution, 1.7 g of palladium chloride was added to the solution, the obtained solution was heated to 70° C. After the reaction, 5 ml of a 4 N aqueous sodium hydroxide solution were added to the solution, the solvent was evaporated, and the residue was dissolved into a small amount of hot water. The solution was filtered with a hot funnel, then a palladium-proline complex (PPro).

Zero point nine four mmol (314 mg) of PPro, 0.05 g of 86% saponified polyvinyl alcohol (average degree of polymerization: 500), 25 g of isopropyl alcohol, and 1 g of ethylene glycol were mixed with water to obtain a solution having a total weight of 100 g. This solution was used as a palladium compound solution.

EXAMPLES 2–5

The same treatment as in Example 1 was performed by using amino acids according to Table 1 in place of proline in Example 1 to prepare a palladium compound solution. A palladium compound solution could be prepared from any amino acid.

TABLE 1

| | Amino Acid | Palladium-amino acid complex |
|---|---|---|
| Example 2 | Serine | PSer |
| Example 3 | Threonine | PThr |
| Example 4 | Hydroxyproline | PHyp |
| Example 5 | Pipecolic acid | PPip |

EXAMPLE 6

A palladium-DL-alanine (to be referred to as PAla hereinafter) used in this example was synthesized in the following manner.

Five grams of potassium chloropalladate (II) were dissolved in 50 $cm^3$ of water, and 5 g of DL-alanine were added to this solution, and the resultant solution was stirred at room temperature for 2 hours. Upon completion of the reaction, the solution was cooled to recrystallize PAla. The reaction product was filtered by suction and dried in a reduced pressure.

When DSC measurement was performed in the air, the decomposition temperature of PAla was 270° C. The same treatment as in Example 1 was performed by using PAla in place of proline in Example 1 to prepare a palladium compound solution.

EXAMPLE 7

A palladium-β-alanine (to be referred to as PBal hereinafter) used in this example was synthesized in the following manner.

Five grams of potassium chloropalladate(II) were dissolved in 50 $cm^3$ of water, and 5 g of β-alanine were added to this solution, and the resultant solution was stirred at room temperature for 2 hours. Upon completion of reaction, 15 $cm^3$ of an 8 N aqueous sodium hydroxide solution was added to the reaction solution to neutralize it. After the reaction solution was concentrated to 20 $cm^3$, the concentrated solution was cooled to recrystallize PBal. The reaction product was filtered by suction and dried in a reduced pressure.

When DSC measurement was performed in the air, the decomposition temperature of PBal was 316° C. The same treatment as in Example 1 was performed by using PBal in place of proline in Example 1 to prepare a palladium compound solution.

EXAMPLE 8

A palladium-ϵ-aminocaproic acid (to be referred to as PAcx hereinafter) used in this example was synthesized in the following manner.

Five grams of potassium chloropalladate (II) were dissolved in 50 $cm^3$ of water, and 8 g of ϵ-aminocaproic acid were added to this solution, and the resultant solution was stirred at room temperature for 2 hours to recrystallize PAcx. Upon completion of recrystallization, the reaction product was filtered by suction and dried in a reduced pressure.

When DSC measurement was performed in the air, the decomposition temperature of PAcx was 370° C. The same treatment as in Example 1 was performed by using PAcx in place of proline in Example 1 to prepare a palladium compound solution.

COMPARATIVE EXAMPLE 1

The same treatment as in Example 1 was to be performed by using palladium acetate in place of PPro in Example 1 to prepare a palladium compound solution. However, palladium acetate was precipitated without being dissolved, and a uniform palladium compound solution could not be obtained.

EXAMPLES 9–16

The palladium compound solutions prepared in Examples 1–8 were filtered by a membrane filter having a bore size of 0.25 μm, and the filtered solutions were filled in bubble-jet printer heads. A DC voltage of 20 V was repetitively applied to heaters in the predetermined heads at a cycle of 1/60 for 7 μs 40,000 times. The printer heads were disassembled, and the heater surfaces were observed with a microscope to evaluate the sizes of burnt matters. The results are shown in Table 2. Note that signs in evaluation are defined as follows; ⊚: fine burnt matter, ○: small burnt matter, Δ: intermediate burnt matter, and x: large burnt matter.

TABLE 2

| | Palladium-amino acid complex | Evaluation |
|---|---|---|
| Example 9 | PPro | ⊚ |
| Example 10 | PSer | ○ |
| Example 11 | PThr | ○ |
| Example 12 | PHyp | ⊚ |
| Example 13 | PPip | ○ |
| Example 14 | PAla | Δ |
| Example 15 | PBal | Δ |
| Example 16 | PAcx | Δ |
| Comparative Example 2 | PAME | x |

COMPARATIVE EXAMPLE 2

The same treatment as in Example 1 was performed by using a palladium acetate-ethanol amine complex (PAME) in place of a palladium-proline complex in Example 1 to prepare a palladium compound solution. The same treatment as in Example 9 was performed, and the heater surface was observed to evaluate the size of burnt matter. The results are shown in Table 2. Note that signs in evaluation are defined as follows; ⊚: fine burnt matter, ○: small burnt matter, Δ: intermediate burnt matter, and x: large burnt matter.

EXAMPLE 17

Figure 1B:
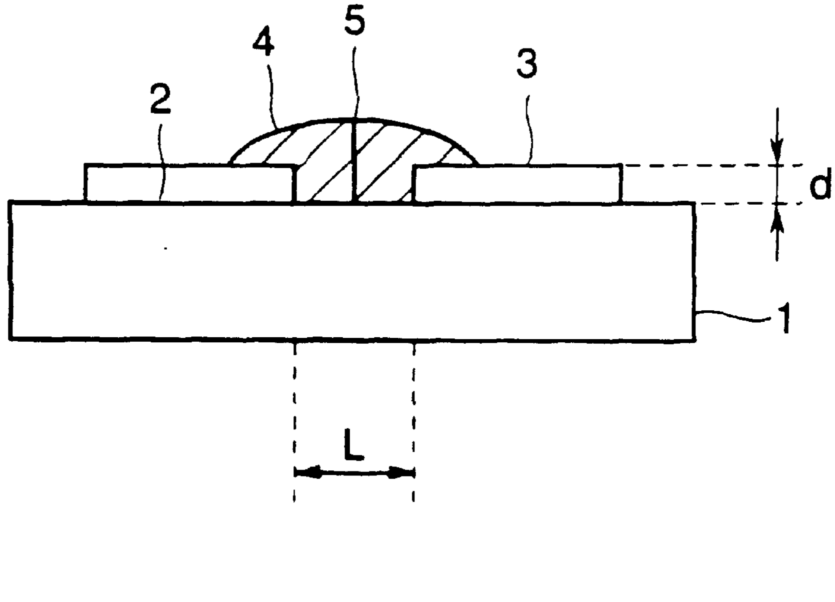

An electron-emitting device of a type shown in FIGS. 1A and 1B was manufactured as an electron-emitting device according to this example. FIG. 1A is a plan view showing this device, and FIG. 1B is a sectional view showing this device. Referring to FIGS. 1A and 1B, reference numeral 1 denotes an insulating substrate; 2, 3, device electrodes for applying a voltage to the device; 4, an electroconductive thin film; and 5, an electron emission portion. Reference symbol L denotes a device electrode gap between the device electrode 2 and the device electrode 3; W, a device electrode width; and d, a device electrode thickness.

A method of manufacturing the electron-emitting device according to this example will be described below with reference to FIGS. 2A to 2D.

Figure 2A:
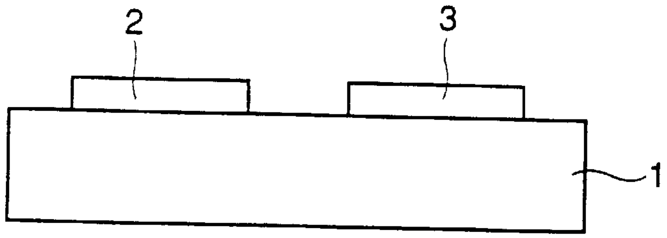
FIGS. 2A to 2D are schematic views showing a method of manufacturing the surface conduction type electron-emitting device according to the present invention.

A quartz substrate was used as the insulating substrate 1, and the substrate 1 was sufficiently washed with an organic solvent, rinsed with water and dried with hot air at 200° C. The device electrodes 2 and 3 consisting of Au were formed on the substrate 1 (FIG. 2A). At this time, the device electrode gap L (FIG. 1A) was set to 3 μm, the device electrode width W (FIGS. 1A and 1B) was set to 500 μm, and the device electrode thickness d (FIG. 1B) was set to 1,000 Å.

Zero point zero four eight grams of PAla was dissolved in 10 g of water to obtain an aqueous solution for BJ application (0.2 Pdwt %).

Figure 2B:
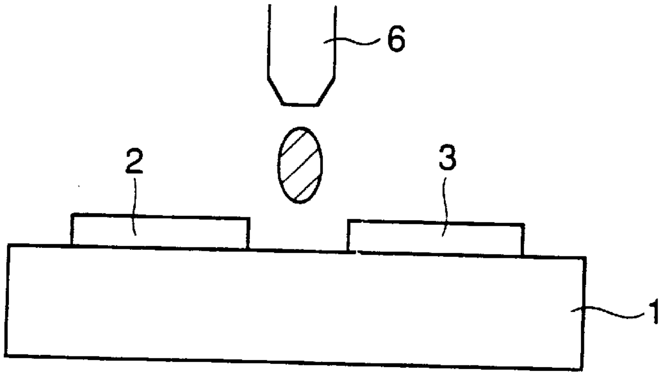
Figure 2C:
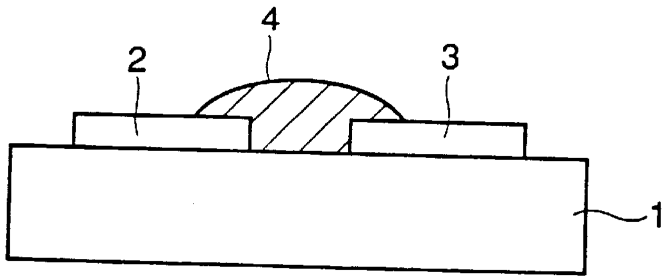

An ink-jet device using the BJ scheme was used, and the aqueous PAla solution was applied from a nozzle 6 of the BJ device into an area between the device electrodes 2 and 3 (FIG. 2B). This organic metal complex thin film was dried at 80° C. for 2 minutes and heated in an oven having an atmospheric atmosphere at 450° C. for 12 minutes to decompose and deposit PAla, thereby forming a fine particle film consisting of palladium oxide fine particles (average particle size: 60 Å) as the electroconductive thin film 4 (FIG. 2C). It was confirmed by X-ray analysis that the thin film consists of palladium oxide. In this case, the electroconductive thin film 4 had a width (device width) of 300 μm, and was arranged on an almost central portion between the device electrodes 2 and 3. The thickness of the electroconductive thin film 4 was 100 Å, and a sheet resistance thereof was $5\times10^4$ Ω.

The fine particle film described here is a film obtained by gathering a plurality of fine particles. This film is not only a film having a fine structure in which fine particles are respectively dispersed and arranged, but also a film having a fine structure in which fine particles are adjacent to each other or overlap (including an island shape). The particle diameter of the fine particle film indicates the diameter of each fine particle whose shape can be recognized in the above state.

Figure 2D:
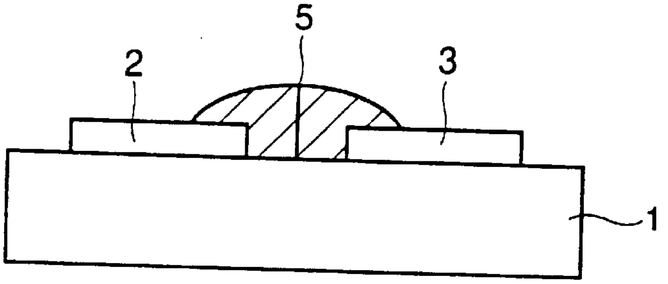
Figure 4A:
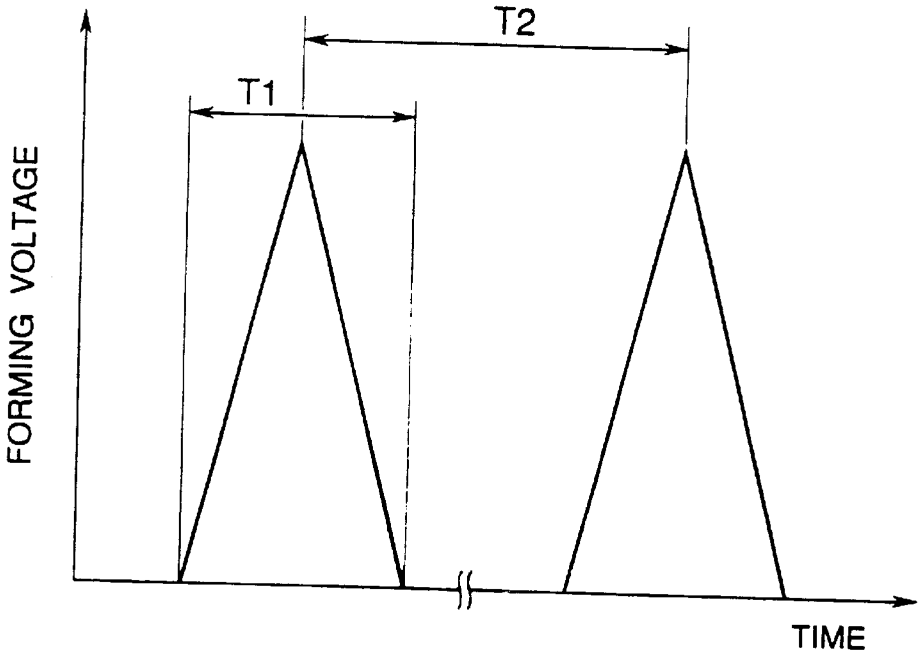
FIGS. 4A and 4B are schematic views showing voltage waveforms in an energization forming treatment which can be applied when the surface conduction type electron-emitting device of the present invention is to be manufactured.

A voltage was applied across the device electrodes 2 and 3 in a vacuum vessel to perform a current conduction treatment (forming treatment) to the electroconductive thin film 4, thereby forming the electron emission portion 5 (FIG. 2D). The waveform of a voltage in the forming treatment is shown in FIG. 4A.

In this example, a pulse width T1 of the voltage waveform was set to 1 ms, a pulse width T2 was set to 10 ms, the peak value (peak value in the forming treatment) of a triangular wave was set to 5 V, and the forming treatment was performed in a vacuum atmosphere of about $1\times10^{-6}$ Torr for 60 seconds. The electron emission portion 5 formed as described above had a state in which fine particles containing palladium as a main component were dispersed and arranged, and the average particle size of the fine particles was 28 Å.

Figure 3:
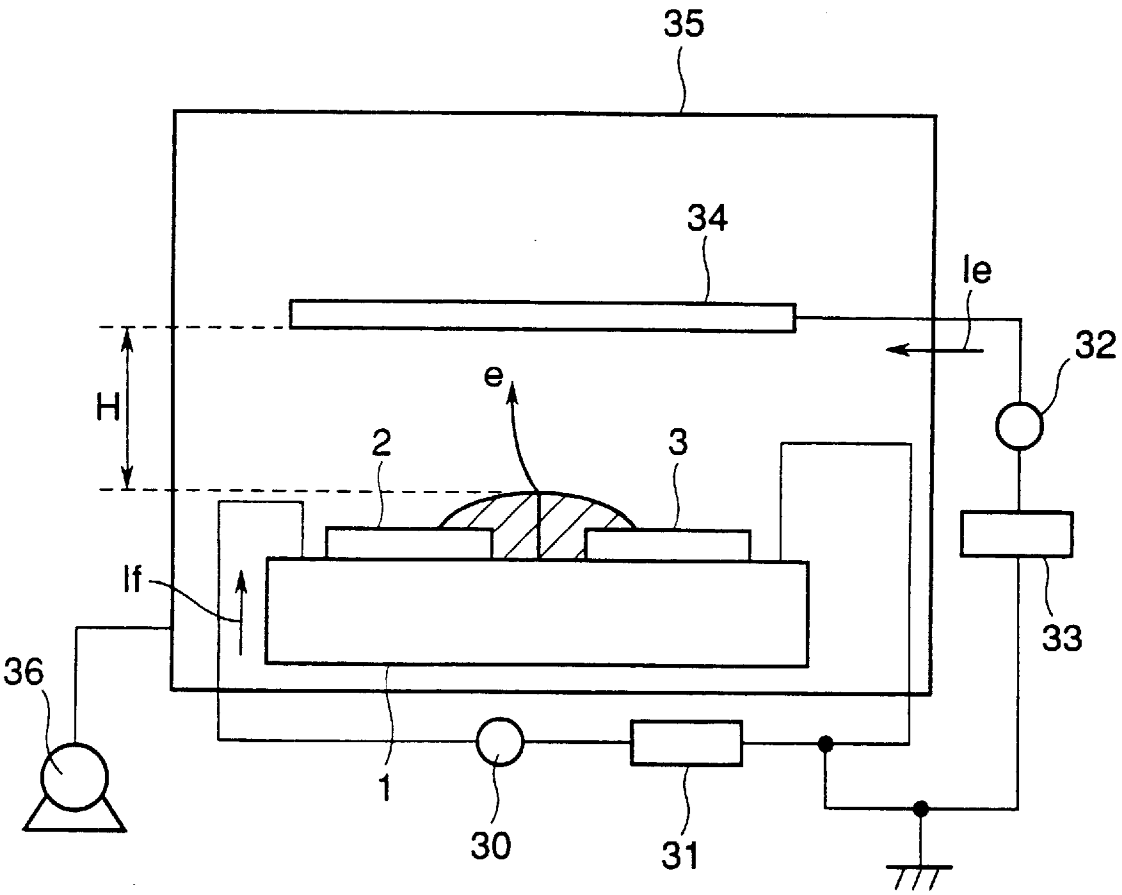
FIG. 3 is a schematic view showing a vacuum processing apparatus having a measurement evaluation function.

The electron emission characteristics of the device manufactured as described above were measured. FIG. 3 is a schematic view showing the arrangement of a measurement evaluation apparatus. In measurement of a device current If and an emission current Ie of the electron-emitting device, a power supply 31 and an ammeter 30 are connected between the device electrodes 2 and 3, and an anode electrode 34 to which a power supply 33 and an ammeter 32 are connected is arranged above the electron-emitting device.

The electron-emitting device and the anode electrode 34 are arranged in a vacuum device 35, and the vacuum device 35 comprises an exhaust pump 36 and equipment such as a vacuum gauge (not shown) required for the vacuum device, so that the measurement evaluation of this device can be performed at a desired vacuum state. In this example, the distance between the anode electrode 34 and the electron-emitting device was set to 4 mm, the potential of the anode electrode 34 was set to 1 kV, and a degree of vacuum in the vacuum device in measurement of electron emission characteristics was set to $1\times10^{-6}$ Torr.

Figure 5:
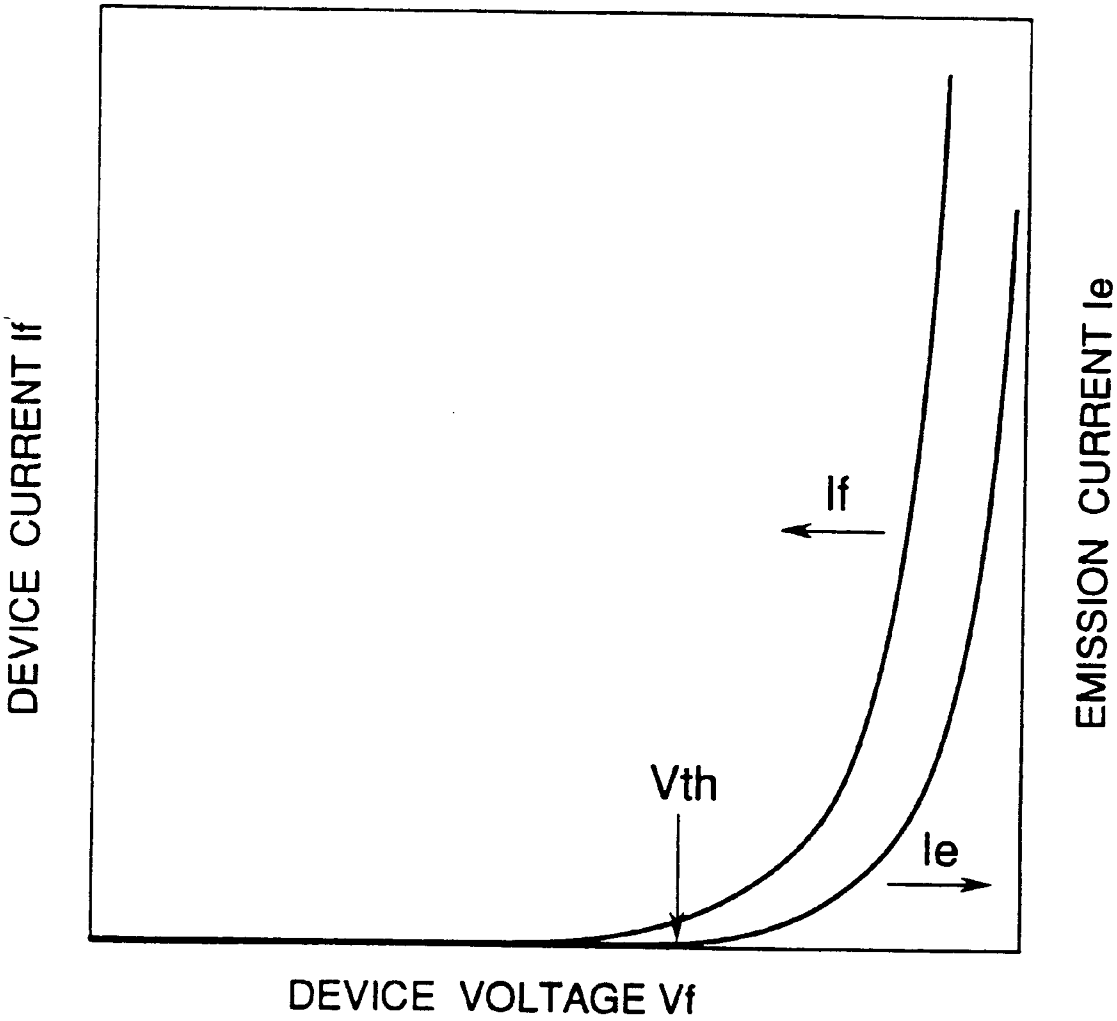
FIG. 5 is a graph showing an example of the relationship among an emission current Ie, a device current If, and a device voltage Vf with respect to a surface conduction type electron-emitting device to which the present invention can be applied.

By using the measurement evaluation apparatus described above, a device voltage was applied across the electrodes 2 and 3 of the electron-emitting device, the device current If and the emission current Ie flowing at this time were measured. In this case, current-voltage characteristics shown in FIG. 5 were obtained. In this device, the emission current Ie sharply increased from an device voltage of about 8 V, the average device current If and the emission current Ie were 2.2 mA and 1.1 μA, respectively, at a device voltage of 16 V, and an electron emission efficiency η=Ie/If (%) was 0.05%.

When the electron emission portion is formed in the example described above, a triangular pulse is applied across the device electrodes to perform a forming treatment. However, the waveform of a pulse applied across the device electrodes is not limited to a triangular wave, and a desired wave such as a rectangular wave may be used. The peak value, pulse width, and pulse interval are not limited to the values described above, desired values can be selected as these values if the electron emission portion is preferably formed.

EXAMPLE 18

Zero point five six grams of PBal serving as an organic metal complex was dissolved in 10 g of water to obtain an aqueous solution for BJ application (2.0 Pdwt %). An electron-emitting device was manufactured by the same method of manufacturing an electron-emitting device as in Example 17.

In this device, a emission current Ie sharply increased from an device voltage of about 8.1 V, an average device current If and an emission current Ie were 2.3 mA and 1.2 μA, respectively, at an device voltage of 16 V, and an electron emission efficiency η=Ie/If (%) was 0.051%.

EXAMPLE 19

An electron-emitting device of a type shown in FIGS. 1A and 1B was manufactured as an electron-emitting device according to this example. FIG. 1A is a plan view showing this device, and FIG. 1B is a sectional view showing this device. Referring to FIGS. 1A and 1B, reference numeral 1 denotes an insulating substrate; 2, 3, device electrodes for applying a voltage to the device; 4, a thin film including an electron emission portion; and 5, an electron emission portion. Referring to FIGS. 1A and 1B, reference symbol L denotes a device electrode gap between the device electrode 2 and the device electrode 3; W, a device electrode width; and d, a device electrode thickness.

A method of manufacturing the electron-emitting device according to this example will be described below with reference to FIGS. 2A to 2D. The same reference numerals as in FIGS. 1A and 1B denote the same parts in FIGS. 2A–2D. A quartz substrate was used as the insulating substrate 1, and the substrate 1 was sufficiently washed with an organic solvent. The device electrodes 2 and 3 consisting of Pt were formed on a surface of the substrate 1 (FIG. 2A). At this time, the device electrode gap L was set to 10 μm, the device electrode width W was set to 500 μm, and the device electrode thickness d was set to 1,000 Å.

Figure 6A:
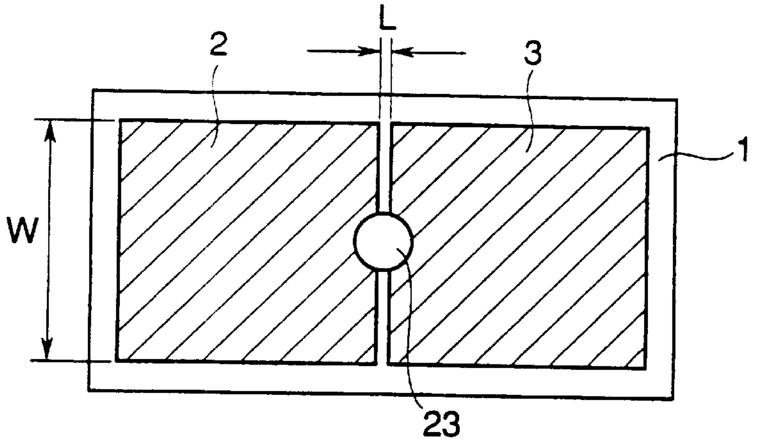
FIGS. 6A to 6C are views for explaining a droplet discharge pattern in the steps in manufacturing the surface conduction type electron-emitting device of the present invention.

Zero point nine four mmol (314 mg) of PPro, 0.05 g of 86% saponified polyvinyl alcohol (average degree of polymerization: 500), 25 g of isopropyl alcohol, and 1 g of ethylene glycol were mixed with water to obtain a solution having a total weight of 100 g. This solution was used as a palladium compound solution. The palladium compound solution was filtered by a membrane filter having a bore size of 0.25 μm, and the filtered solution was filled in a bubble-jet printer head. A DC voltage of 20 V was applied to a heater in the predetermined head for 7 μs to discharge the palladium compound solution into the gap portion between the device electrodes 2 and 3 of the quartz substrate (FIG. 2B). The discharge was repeated five times while keeping the positions of the head and the substrate constant (FIG. 6A). An obtained droplet 23 was almost circular having a diameter of about 110 μm.

This substrate was heated in an oven having the atmospheric air at 350° C. for 15 minutes to decompose and deposit the metal compound on the substrate, thereby forming a fine particle film consisting of palladium oxide fine particles (in this example, average particle size: 65 Å) as the electroconductive thin film 4 (FIG. 2C). The electric resistance between the device electrodes 2 and 3 was 10 kΩ.

Figure 4B:
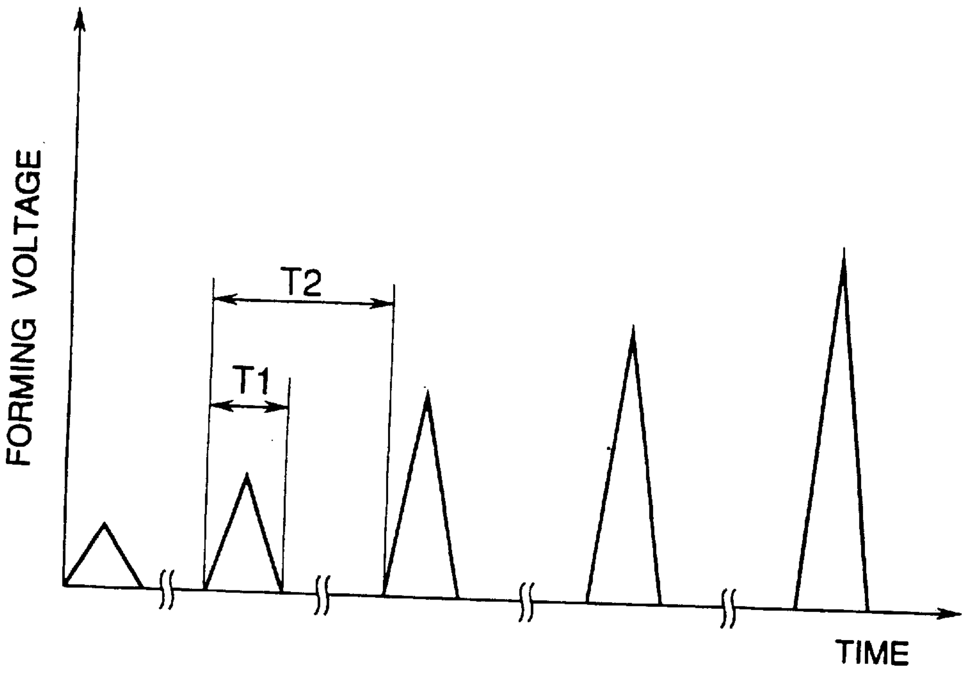

As shown in FIG. 2D, the electron emission portion 5 was formed by applying a voltage across the device electrodes 2 and 3 to perform a current conduction treatment (forming treatment) to the thin film for forming an electron emission portion. A voltage waveform in the forming treatment is shown in FIG. 4B. Referring to FIG. 4B, reference symbols T1 and T2 denote the pulse width and pulse interval of the voltage waveform, respectively. In this example, T1 and T2 were set to 1 ms and 10 ms, respectively, and the peak value (peak voltage in a forming treatment) of a triangular wave was increased. The forming treatment was performed in a vacuum atmosphere of about $1\times10^{-6}$ Torr.

The emission current and the like of the device manufactured as described above were measured to evaluate its electron emission characteristics. As in Example 17, this evaluation was performed by using the measurement evaluation apparatus in FIG. 3.

An device voltage was applied across the electrodes 2 and 3 of the electron-emitting device, the device current If and the emission current Ie flowing at this time were measured. In this case, current-voltage characteristics shown in FIG. 5 were obtained. In this device, the emission current Ie sharply increased from the device voltage of about 7.4 V, the average device current If and the emission current Ie were 2.4 mA and 1.0 $\mu$A, respectively, at a device voltage of 16 V, and an electron emission efficiency $\eta$=Ie/If (%) was 0.042%.

A face plate having a phosphor film and a metal back was arranged in the vacuum device 35 in place of the anode electrode 34 in the measurement evaluation apparatus (FIG. 3). When electron emission from the electron source was tried, a part of the phosphor film emitted light, and the intensity of light emission changes depending on the device current Ie. In this manner, it was understood that this device functioned as a light-emitting image forming apparatus.

When the electron emission portion is formed in the example described above, a triangular pulse is applied across the device electrodes to perform a forming treatment. However, the waveform of a pulse applied across the device electrodes is not limited to a triangular wave, and a desired wave such as a rectangular wave may be used. The peak value, pulse width, and pulse interval are not limited to the values described above, desired values can be selected as these values if the electron emission portion is preferably formed.

EXAMPLES 19-2 AND 19-3

Electron-emitting devices were manufactured in the same manner as in Example 19 except that palladium compound solutions prepared by using PSer and PThr, respectively for Examples 19-2 and 19-3, in place of. PPro used in Example 19. The manufactured devices showed substantially the same electron emission characteristics as the device of Example 19.

COMPARATIVE EXAMPLE 4

Device electrodes consisting of Pt were formed on a quartz substrate in the same manner as in Example 19.

A palladium compound solution was prepared in the same manner as in Example 19 except that 0.94 mmol was used in place of PPro, and by using the palladium compound solution, a droplet was applied into the gap portion between the device electrodes of the substrate by means of a BJ device. The resultant film was heated and decomposed at 300° C. in the air for 12 minutes to form an electroconductive thin film mainly consisting of palladium oxide particles, a forming treatment was performed to the electroconductive thin film in the same manner as in Example 19, and the electron emission characteristics of the electroconductive thin film were measured. When an device voltage was set to 16 V, an device current If, a emission current Ie, and a electron emission efficiency $\eta$ were 2.3 mA, 1.1 $\mu$A, and 0.048%, respectively.

Subsequently, a substrate was formed in such a manner that silicon oxide was deposited on a soda-lime glass by sputtering to have a thickness of 0.5 $\mu$m, and a plurality of device electrode pairs were formed on the substrate. Each device electrode was formed in such a manner that a Pt film was formed by sputtering and patterned by a photolithography technique. The device electrode pairs were two-dimensionally arranged in 100×100. That is, 10,000 pairs of device electrodes were formed on one substrate.

By using the same organic palladium solutions as in Examples 17, 18, 19, 19-2, 19-3 and Comparative Example 4, a droplet was applied to each device electrode pair, and heating and decomposing treatments were performed under the same conditions as in the above examples and comparative example.

By using the above six types of organic palladium solutions, electroconductive films were respectively formed on 10 substrates for each of the organic palladium solutions. A forming treatment was performed to the first 100 devices of the first substrate on which an electroconductive film was formed by each organic palladium solution and to the last 100 devices of the last substrate on which an electroconductive film was formed by each organic palladium solution, and the shapes of electron emission portions were observed by a scanning electron microscope (SEM).

Preferable electron emission portions were formed in the first 100 devices and the last 100 devices obtained by the same solutions as in Examples 17, 18, 19, 19-2 and 19-3. However, large foreign matters were detected in the electroconductive thin films of 5 devices of the 100 devices of the last 100 devices obtained by the same solution as in Comparative Example 4. In each device in which a foreign matter was detected, it was observed that an electron emission portion which was formed near the central portion of the device electrode gap was formed around the central portion, thereby deforming the electron emission portion as a whole. It is estimated that the foreign matter is formed such that a burnt matter deposited on a heater is peeled therefrom and discharged with a droplet. When the characteristics of the electron-emitting devices were measured, the emission currents Ie of the five devices were smaller than those of the other devices.

When the formation of electroconductive films continued using the solution in Comparative Example 4, it was observed that a rate of mixing large foreign matters in the conductive films was gradually increased. Finally, the BJ head was clogged, so that a droplet could not be discharged.

On the other hand, different results were obtained when the formation of electroconductive films was continued using the solutions of Examples 17, 18, 19, 19-2 and 19-3, and the last 100 devices of the 100th substrate for each solution were observed. As a result, large foreign matters which seemed to be burnt matters peeled off were found in the 12, 15, 2 and 3 devices, respectively in case of using the solutions of Examples 17, 18, 19-2 and 19-3 No foreign matter was found in the case of using the solution of Example 19, which formed a good electroconductive film without burnt matter.

EXAMPLES 20–23

The same treatment as in Example 19 was performed by using palladium compound (PSer, PThr, PHyp, and PPip) solutions prepared in Examples 2–5 in place of the palladium compound solution in Example 19 to form electron-emitting devices. Any of the solutions could be easily coated on the substrate surfaces. After the devices were formed, an electron emission phenomenon was confirmed at a device voltage of 14 to 18 V.

EXAMPLE 24

Figure 6B:
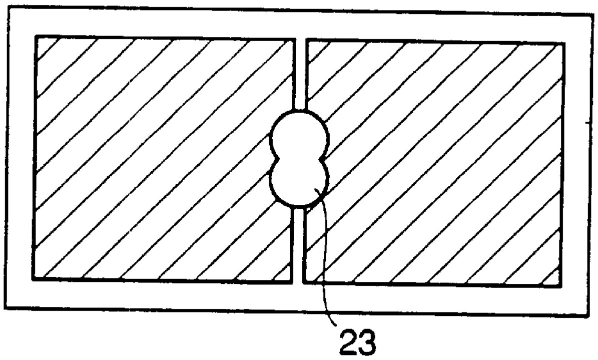

A quartz substrate on which device electrodes 2 and 3 were formed was formed in the same manner as in Example 19. The palladium compound solution used in Example 19 was filled in a bubble-jet printer head, an external DC voltage of 20 V was applied to a heater in the predetermined head for 7 $\mu$s to discharge the palladium compound solution into the gap portion between the device electrodes 2 and 3 on the quartz substrate six times. Immediately, the substrate was moved in the gap direction by 70 $\mu$m, and the palladium compound solution was discharged from the head six times (FIG. 6B).

When this substrate was heated at 350° C. for 12 minutes to thermally decompose the palladium compound, palladium oxide was generated. The electric resistance between the device electrodes 2 and 3 became 7 kΩ.

Predetermined energization forming and an activation treatment were performed to the substrate in the same manner as in Example 19, and the device was evaluated as an electron-emitting device. As a result, an electron emission efficiency at a device voltage of 16 V was 0.044%.

EXAMPLES 25–28

The same treatment as in Example 24 was performed by using palladium compound solutions prepared in Examples 2–5 in place of the palladium compound solution in Example 24 to form electron-emitting devices. Any of the solutions could be easily coated on the substrate surfaces. After the devices were formed, an electron emission phenomenon was confirmed at a device voltage of 14 to 18 V.

EXAMPLE 29

Figure 6C:
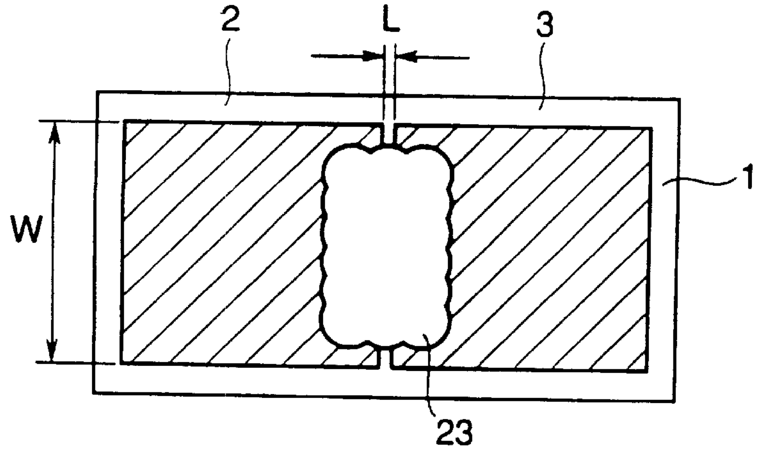
Figure 7:
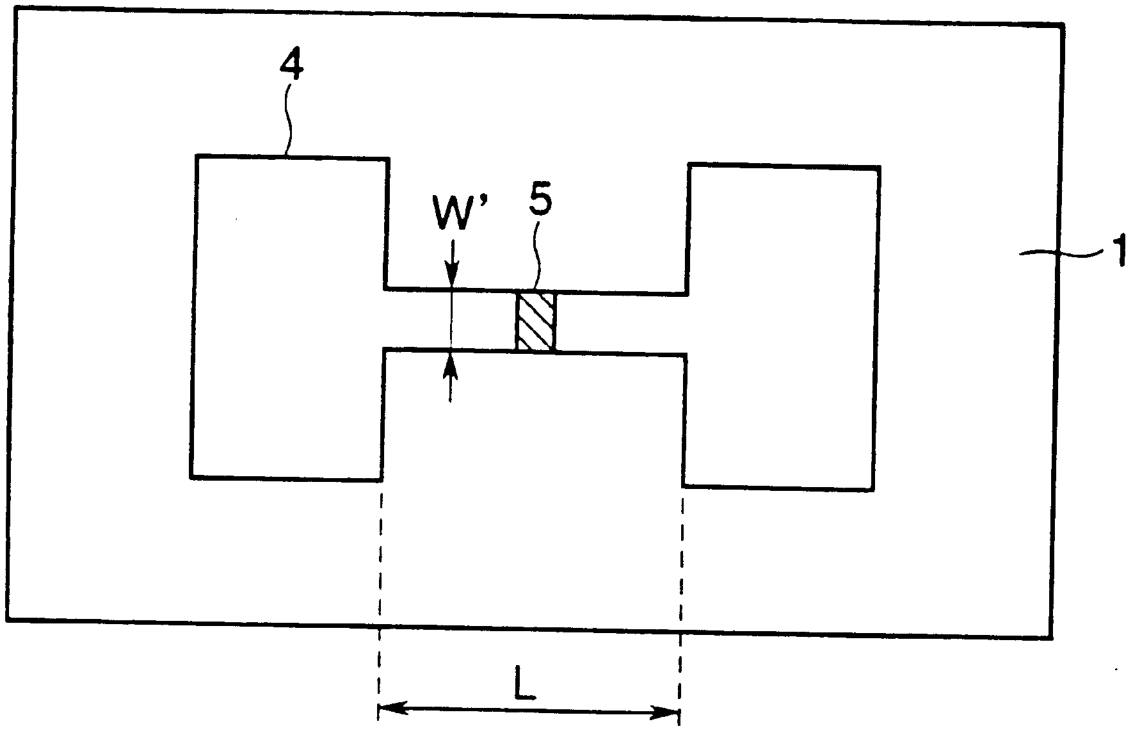
FIG. 7 is a schematic view showing a surface conduction type electron-emitting device by Hartwell.

A quartz substrate was used as an insulating substrate 1, and the substrate 1 was sufficiently washed with an organic solvent. Device electrodes 2 and 3 consisting of Pt were formed on a surface of the substrate 1. At this time, the device electrode gap L was set to 30 μm, the device electrode width W was set to 500 μm, and the device electrode thickness d was set to 1,000 Å. The palladium compound solution was filtered by a membrane filter having a bore size of 0.25 μm, and the filtered solution was filled in a bubble-jet printer head. The head was fixed on a planar movement stage such that the direction of a discharge port array coincided with the electron electrode gap direction of the substrate, and the head was kept 1.6 mm above the substrate surface. An external DC voltage of 20 V was applied to five predetermined adjacent heaters for 7 μs at intervals of 180 μsec three times while the head was moved at 280 mm/sec by the movement stage in a direction perpendicular to the device electrode gap. A rectangular pattern consisting of 15 droplets was formed around the electrode gap of the substrate (FIG. 6C).

When this substrate was heated at 350° C. for 12 minutes to thermally decompose the palladium compound, uniform palladium oxide was generated on the portion of the rectangular pattern. The electric resistance between the device electrodes 2 and 3 became 3 kΩ.

Predetermined energization forming and an activation treatment were performed to the substrate in the same manner as in Example 19, and the device was evaluated as an electron-emitting device. As a result, a electron emission efficiency at an device voltage of 14 V was 0.04%.

EXAMPLES 30–33

The same treatment as in Example 29 was performed by using palladium compound solutions prepared in Examples 2–5 in place of the palladium compound solution in Example 29 to form electron-emitting devices. Any of the solutions could be easily coated on the substrate surfaces. After the devices were formed, an electron emission phenomenon was confirmed at a device voltage of 14 to 18 V.

EXAMPLE 34

One gram of completely saponified polyvinyl alcohol (saponification rate: 99%, average degree of polymerization: 500) was added to 80 ml of dimethyl formamide, and the mixture was stirred without humidity. Trimethylamine was added to the mixture, and this mixture was cooled by ice. One point eight grams of acetyl chloride were added to the mixture, and the resultant mixture was stirred for 2 hours while being cooled. The reaction mixture was poured into 350 ml of water, and the aqueous solution was stirred with 150 g of a desalting ion exchange resin, and the resin was filtered out, thereby obtaining a liquid component. This liquid was stirred with 100 g of a desalting ion exchange resin, and the resin was filtered out, thereby obtaining a liquid component. The obtained liquid was slowly concentrated at a reduced pressure, and the concentrated solution was added with about 30 ml of water. The resultant solution was freeze-dried in a vacuum state, thereby obtaining 0.8 g of a polymer. On the basis of the results obtained by CHN element analysis, the acetylating rate of polyvinyl alcohol was estimated to be 8.2%.

Zero point zero five grams of the polymer, 0.94 mmol (314 mg) of PPro, 25 g of isopropyl alcohol, and 1 g of ethylene glycol were mixed with water to obtain a solution having a total weight of 100 g. The same treatment as in Example 29 was performed by using the solution in place of the palladium compound solution in Example 29 to form an electron-emitting device. An electron emission phenomenon was confirmed at a device voltage of 16V.

EXAMPLES 35–38

The same treatment as in Example 34 was performed by using palladium-amino-acid complexes prepared in Examples 2–5 in place of PPro in Example 34 to form electron-emitting devices. Any of the solutions could be easily coated on the substrate surfaces. After the devices were formed, an electron emission phenomenon was confirmed at a device voltage of 15 to 18 V.

EXAMPLES 39–48

Polyvinyl alcohol esters shown in the following Table 3 were synthesized by a method according to Example 34. By using the obtained polymers (A) to (J), electron-emitting devices were formed in the same manner as in Example 34. Table 3 shows used esterifying agents and the amounts thereof, the estimation values of esterification rates based on element analysis, and evaluation of the nondefective/defective ratio of the obtained thin film portions. Note that the evaluation is related to pattern forming capability, and an evaluation method is as follows. That is, thin film portions (23 in FIG. 6C) obtained immediately after a droplet was applied and 3 hours after the droplet was applied were observed with a microscope, and the area ratio of the thin film portions was used for the evaluation. Signs used in evaluation are defined as follows; ⊚: excellent (area ratio: 90% or more), and ○: good (area ratio: less than 90%).

Organic metal compound films were formed on soda-lime glass plates bearing thereon a 0.5 μm thick sputtered film of $SiO_2$, by using the solutions of Examples 39 and 42 as a plurality of BJ dots overlapping with each other. Discharge conditions of the BJ apparatus were adjusted to form a dot with a diameter of 30 μm, and 5×5 dots were formed as having a distance of 18 μm between centers of adjacent dots. After application of liquid droplets, then drying and baking at 350° C. for 10 minutes to form electroconductive films, configuration of the films were observed by means of a scanning electron microscope.

As a result of observation, it was found that some electroconductive films formed by using the solution of Example 39 had a hole, while no such defective film was found among those formed by using the solution of Example 42. It is considered that such a hole was formed by shrinkage of the dots during drying. That is, the use of a solution which does not cause considerable area reduction of dots during drying will give more exact patterns.

TABLE 3

| | Polymer | Acylating Agent | Content | Esterification rate | Evaluation |
|---|---|---|---|---|---|
| Example 39 | (A) | Acetyl chloride | 80 mg | 2.4% | ○ |
| Example 40 | (B) | Acetyl chloride | 110 mg | 4.1% | ○ |
| Example 41 | (C) | Acetyl chloride | 130 mg | 5.3% | ◎ |
| Example 42 | (D) | Acetyl chloride | 210 mg | 9.9% | ◎ |
| Example 43 | (E) | Acetyl chloride | 460 mg | 21.5% | ◎ |
| Example 44 | (F) | Acetyl chloride | 530 mg | 24.6% | ◎ |
| Example 45 | (G) | Acetyl chloride | 590 mg | 26.6% | ○ |
| Example 46 | (H) | Propionyl chloride | 250 mg | 8.8% | ◎ |
| Example 47 | (I) | Propionyl chloride | 350 mg | 12.7% | ◎ |
| Example 48 | (J) | Isobutyryl chloride | 290 mg | 8.3% | ◎ |

EXAMPLES 49–58

By using polymers (A) to (J) obtained in Examples 39–48, electron-emitting devices were manufactured in the same manner as in Example 35. Evaluation of the nondefective/defective ratio of the thin film portions of the obtained devices is shown in Table 4. Note that the evaluation is performed in the same manner as in Examples 39–48, and signs used in evaluation are defined as follows: ◎: excellent (area ratio: 90% or more), and ○: good (area ratio: less than 90%).

TABLE 4

| | Polymer | Evaluation |
|---|---|---|
| Example 49 | (A) | ○ |
| Example 50 | (B) | ○ |
| Example 51 | (C) | ○ |
| Example 52 | (D) | ◎ |
| Example 53 | (E) | ◎ |
| Example 54 | (F) | ○ |
| Example 55 | (G) | ○ |
| Example 56 | (H) | ○ |
| Example 57 | (I) | ○ |
| Example 58 | (J) | ○ |

EXAMPLES 59–68

By using polymers obtained in Examples 39–48, electron-emitting devices were manufactured in the same manner as in Example 36. Evaluation of the nondefective/defective ratio of the thin film portions of the obtained devices is shown in Table 5. Note that the evaluation is performed in the same manner as in Examples 39–48, and signs used in evaluation are defined as follows: ◎: excellent (area ratio: 90% or more), and ○: good (area ratio: less than 90%).

TABLE 5

| | Polymer | Evaluation |
|---|---|---|
| Example 59 | (A) | ○ |
| Example 60 | (B) | ○ |
| Example 61 | (C) | ◎ |
| Example 62 | (D) | ◎ |
| Example 63 | (E) | ◎ |
| Example 64 | (F) | ◎ |
| Example 65 | (G) | ○ |
| Example 66 | (H) | ◎ |
| Example 67 | (I) | ○ |
| Example 68 | (J) | ○ |

EXAMPLES 69–78

By using polymers obtained in Examples 39–48, electron-emitting devices were manufactured in the same manner as in Example 37. Evaluation of the nondefective/defective ratio of the thin film portions of the obtained devices is shown in Table 6. Note that the evaluation is performed in the same manner as in Examples 39–48, and signs used in evaluation are defined as follows: ◎: excellent (area ratio: 90% or more), and ○: good (area ratio: less than 90%).

TABLE 6

| | Polymer | Evaluation |
|---|---|---|
| Example 69 | (A) | ○ |
| Example 70 | (B) | ○ |
| Example 71 | (C) | ○ |
| Example 72 | (D) | ◎ |
| Example 73 | (E) | ◎ |
| Example 74 | (F) | ○ |
| Example 75 | (G) | ○ |
| Example 76 | (H) | ◎ |
| Example 77 | (I) | ◎ |
| Example 78 | (J) | ◎ |

EXAMPLES 79–88

By using polymers obtained in Examples 39–48, electron-emitting devices were manufactured in the same manner as in Example 38. Evaluation of the nondefective/defective ratio of the thin film portions of the obtained devices is shown in Table 7. Note that the evaluation is performed in the same manner as in Examples 39–48, and signs used in evaluation are defined as follows: ◎: excellent (area ratio: 90% or more), and ○: good (area ratio: less than 90%).

TABLE 7

| | Polymer | Evaluation |
|---|---|---|
| Example 79 | (A) | ○ |
| Example 80 | (B) | ○ |
| Example 81 | (C) | ◎ |
| Example 82 | (D) | ◎ |
| Example 83 | (E) | ◎ |
| Example 84 | (F) | ○ |
| Example 85 | (G) | ○ |
| Example 86 | (H) | ○ |
| Example 87 | (I) | ◎ |
| Example 88 | (J) | ◎ |

EXAMPLES 89–98

By respectively using polyhydric alcohols below at weights shown in Table 8 in place of ethylene glycol (1 g) of the palladium compound solution used in Example 29, solutions were prepared. When the weight of polyhydric alcohol was different from 1 g, the weight of water was increased or decreased such that the total weight of the solution was 100 g. By using these solutions in place of the palladium compound solution in Example 29, the same treatment as in Example 29 was performed to form electron-emitting devices. Evaluation of the nondefective/defective ratio of the thin film portions of the obtained devices is shown in Table 8. Note that signs used in evaluation are defined as follows: ⊚: excellent, and ○: good.

TABLE 8

| | Polyhydric alcohol | Content | Evaluation |
|---|---|---|---|
| Example 89 | | 0.0g | ○ |
| Example 90 | Ethylene glycol | 0.2g | ⊚ |
| Example 91 | Ethylene glycol | 3.0g | ⊚ |
| Example 92 | Ethylene glycol | 5.0g | ⊚ |
| Example 93 | Ethylene glycol | 7.0g | ○ |
| Example 94 | Ethylene glycol | 10.0g | ○ |
| Example 95 | Glycerine | 0.3g | ⊚ |
| Example 96 | Glycerine | 2.5g | ⊚ |
| Example 97 | Glycerine | 6.0g | ○ |
| Example 98 | Propylene glycol | 1.0g | ⊚ |

EXAMPLES 99–108

By respectively using polyhydric alcohols at weights shown in Table 9 in place of ethylene glycol (1 g) of the palladium compound solution used in Example 30, solutions were prepared. When the weight of polyhydric alcohol was different from 1 g, the weight of water was increased or decreased such that the total weight of the solution was 100 g. By using these solutions in place of the palladium compound solution in Example 30, the same treatment as in Example 30 was performed to form electron-emitting devices. Evaluation of the nondefective/defective ratio of the thin film portions of the obtained devices is shown in Table 9. Note that signs used in evaluation are defined as follows: ⊚: excellent, and ○: good.

TABLE 9

| | Polyhydric alcohol | Content | Evaluation |
|---|---|---|---|
| Example 99 | | 0.0g | ○ |
| Example 100 | Ethylene glycol | 0.2g | ⊚ |
| Example 101 | Ethylene glycol | 3.0g | ⊚ |
| Example 102 | Ethylene glycol | 5.0g | ⊚ |
| Example 103 | Ethylene glycol | 7.0g | ○ |
| Example 104 | Ethylene glycol | 10.0g | ○ |
| Example 105 | Glycerine | 0.3g | ⊚ |
| Example 106 | Glycerine | 2.5g | ⊚ |
| Example 107 | Glycerine | 6.0g | ○ |
| Example 108 | Propylene glycol | 1.0g | ○ |

EXAMPLES 109–118

By respectively using polyhydric alcohols at weights shown in Table 10 in place of ethylene glycol (1 g) of the palladium compound solution used in Example 31, solutions were prepared. When the weight of polyhydric alcohol was different from 1 g, the weight of water was increased or decreased such that the total weight of the solution was 100 g. By using these solutions in place of the palladium compound solution in Example 31, the same treatment as in Example 31 was performed to form electron-emitting devices. Evaluation of the nondefective/defective ratio of the thin film portions of the obtained devices is shown in Table 10. Note that signs used in evaluation are defined as follows: ⊚: excellent, and ○: good.

TABLE 10

| | Polyhydric alcohol | Content | Evaluation |
|---|---|---|---|
| Example 109 | | 0.0g | ○ |
| Example 110 | Ethylene glycol | 0.2g | ⊚ |
| Example 111 | Ethylene glycol | 3.0g | ⊚ |
| Example 112 | Ethylene glycol | 5.0g | ⊚ |
| Example 113 | Ethylene glycol | 7.0g | ○ |
| Example 114 | Ethylene glycol | 10.0g | ○ |
| Example 115 | Glycerine | 0.3g | ⊚ |
| Example 116 | Glycerine | 2.5g | ⊚ |
| Example 117 | Glycerine | 6.0g | ○ |
| Example 118 | Propylene glycol | 1.0g | ○ |

EXAMPLES 119–128

By respectively using polyhydric alcohols at weights shown in Table 11 in place of ethylene glycol (1 g) of the palladium compound solution used in Example 32, solutions were prepared. When the weight of polyhydric alcohol was different from 1 g, the weight of water was increased or decreased such that the total weight of the solution was 100 g. By using these solutions in place of the palladium compound solution in Example 32, the same treatment as in Example 32 was performed to form electron-emitting devices. Evaluation of the nondefective/defective ratio of the thin film portions of the obtained devices is shown in Table 11. Note that signs used in evaluation are defined as follows: ⊚: excellent, and ○: good.

TABLE 11

| | Polyhydric alcohol | Content | Evaluation |
|---|---|---|---|
| Example 119 | | 0.0g | ○ |
| Example 120 | Ethylene glycol | 0.2g | ⊚ |
| Example 121 | Ethylene glycol | 3.0g | ⊚ |
| Example 122 | Ethylene glycol | 5.0g | ⊚ |
| Example 123 | Ethylene glycol | 7.0g | ○ |
| Example 124 | Ethylene glycol | 10.0g | ○ |
| Example 125 | Glycerine | 0.3g | ⊚ |
| Example 126 | Glycerine | 2.5g | ⊚ |
| Example 127 | Glycerine | 6.0g | ○ |
| Example 128 | Propylene glycol | 1.0g | ⊚ |

EXAMPLES 129–138

By respectively using polyhydric alcohols at weights shown in Table 12 in place of ethylene glycol (1 g) of the palladium compound solution used in Example 33, solutions were prepared. When the weight of polyhydric alcohol was different from 1 g, the weight of water was increased or decreased such that the total weight of the solution was 100 g. By using these solutions in place of the palladium compound solution in Example 33, the same treatment as in Example 33 was performed to form electron-emitting devices. Evaluation of the nondefective/defective ratio of the thin film portions of the obtained devices is shown in Table 12. Note that signs used in evaluation are defined as follows: ⊚: excellent, and ○: good.

TABLE 12

| | Polyhydric alcohol | Content | Evaluation |
|---|---|---|---|
| Example 129 | | 0.0g | ○ |
| Example 130 | Ethylene glycol | 0.2g | ⊚ |
| Example 131 | Ethylene glycol | 3.0g | ⊚ |

TABLE 12-continued

| | Polyhydric alcohol | Content | Evaluation |
|---|---|---|---|
| Example 132 | Ethylene glycol | 5.0g | ◎ |
| Example 133 | Ethylene glycol | 7.0g | ○ |
| Example 134 | Ethylene glycol | 10.0g | ○ |
| Example 135 | Glycerine | 0.3g | ◎ |
| Example 136 | Glycerine | 2.5g | ◎ |
| Example 137 | Glycerine | 6.0g | ○ |
| Example 138 | Propylene glycol | 1.0g | ◎ |

EXAMPLE 139

Figure 8:
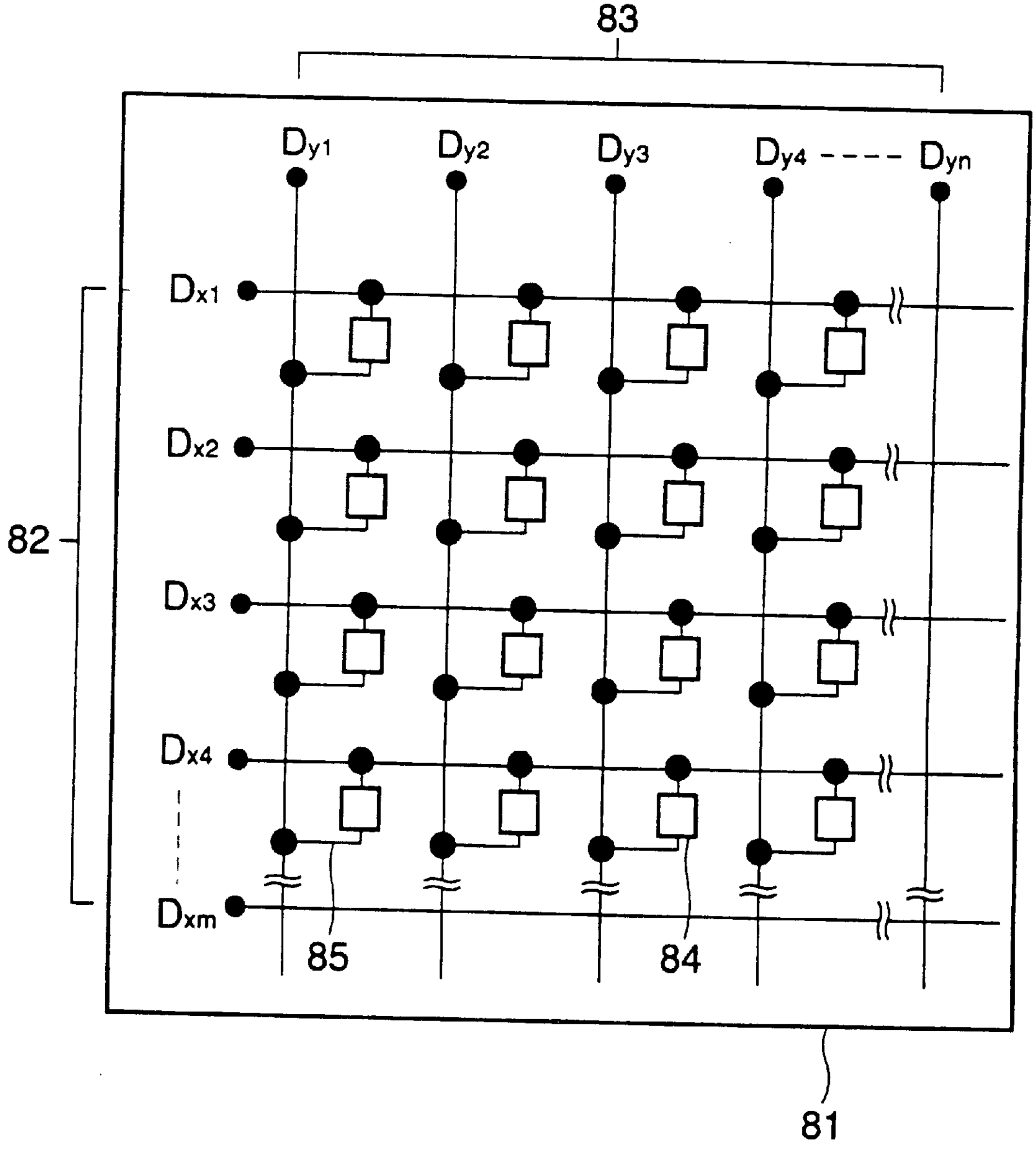
FIG. 8 is a schematic sectional view showing an electron source in a simple matrix arrangement to which the present invention can be applied.
Figure 10:
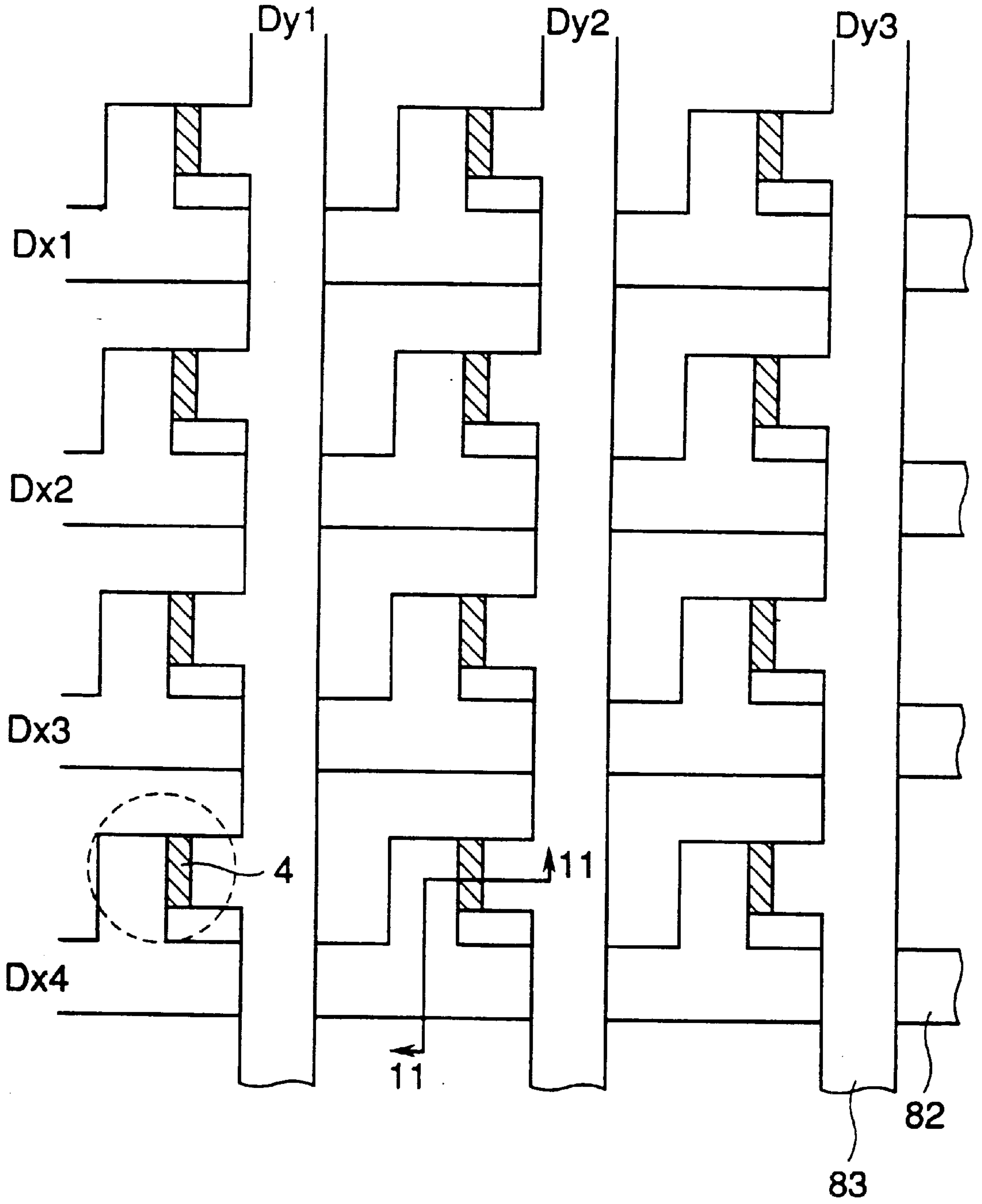
FIG. 10 is a plan view showing a part of an electron source according to the present invention.
Figure 11:
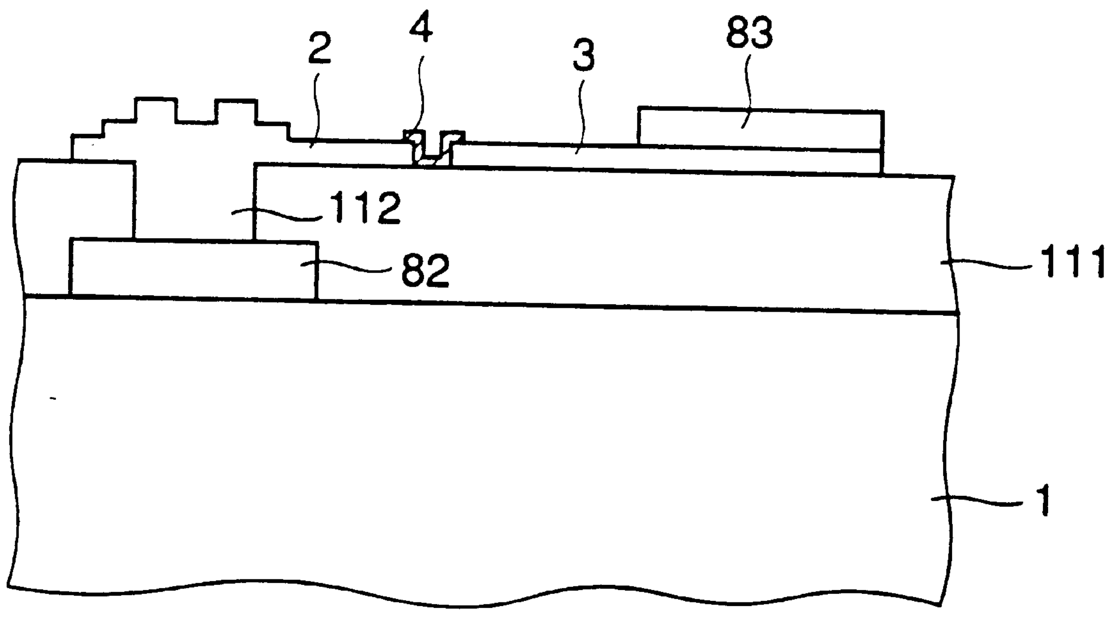
FIG. 11 is a sectional view showing the electron source along a line 11—11 in FIG. 10.

FIG. 10 is a plan view showing a part of an electron source, and FIG. 11 is a sectional view showing the electron source along a line 11—11 in FIG. 10. The reference numerals in FIG. 10 denote the same parts in FIG. 11. In this case, reference numeral 1 denotes an insulating substrate; 82, an X-direction wiring (also called a lower wiring) corresponding to $Dx_m$ in FIG. 8; 83, a Y-direction wiring (also called an upper wiring) corresponding to $Dy_n$ in FIG. 8; 4, an electroconductive thin film; 2, 3, device electrodes; 111, an insulating interlayer; and 112, a contact hole for electrically connecting the device electrode 2 to the lower wiring 82.

Step—a

Figure 12A:
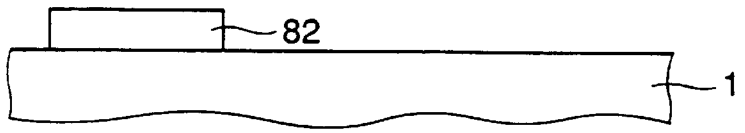
FIGS. 12A to 12H are sectional views showing the steps a to h in manufacturing the electron source shown in FIG. 11.

A Cr film having a thickness of 50 Å and an Au film having a thickness of 6,000 Å were sequentially formed by a vacuum deposition method on the substrate 1 obtained by forming a silicon oxide film having a thickness of 0.5 μm on a cleaned soda-lime glass by sputtering, and a photoresist (AZ1370 available from Hoechst) was spin-coated on the substrate by a spinner and baked. The photomask was exposed and developed to form the resist pattern of the lower wiring 82. The Au/Cu deposition films were wet-etched to form the lower wiring 82 having a desired shape {FIG. 12A}.

Step—b

Figure 12B:
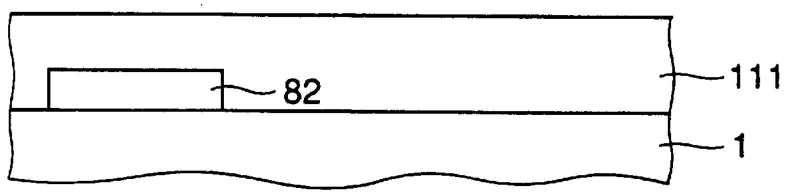

The insulating interlayer 111 consisting of a silicon oxide film having a thickness of 1.0 μm was deposited by RF sputtering {FIG. 12B}.

Step—c

Figure 12C:
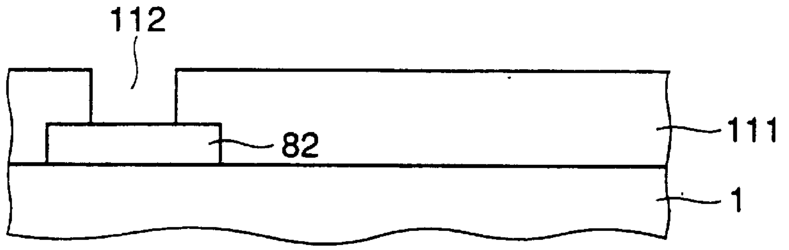

A photoresist pattern for forming the contact hole 112 in the silicon oxide film deposited in step b was formed, and the insulating interlayer 111 was etched using the photoresist pattern as a mask to form the contact hole 112. In this etching, an RIE (Reactive Ion Etching) method using $CF_4$ and $H_2$ gases was used {FIG. 12C}.

Step—d

Figure 12D:
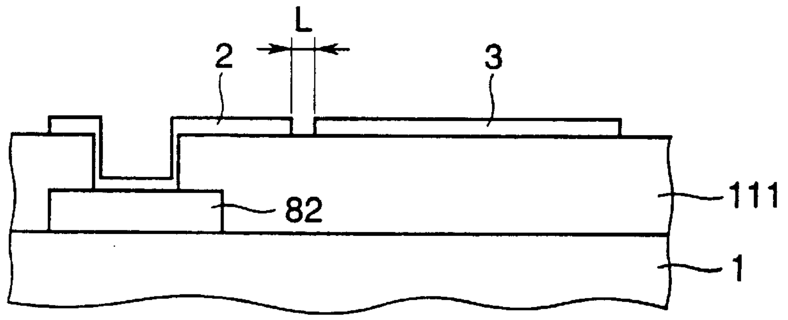

Thereafter, a pattern to be the device electrodes 2 and 3 and an inter-device-electrode gap L was formed by a photoresist (RD-2000N-41 available from Hitachi Chemical Co., Ltd.), and a Ti film having a thickness of 50 Å and an Ni film having a thickness of 1,000 Å were sequentially deposited on the resultant structure by a vacuum deposition method. The photoresist pattern was dissolved with an organic solvent to lift the Ni/Ti deposition films off, thereby forming the device electrodes 2 and 3 having an inter-device-electrode gap L of 3 μm and a device electrode width of 300 μm {FIG. 12D}.

Step—e

Figure 12E:
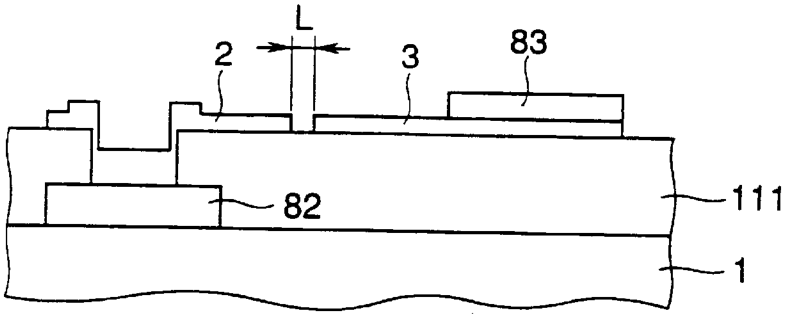

A photoresist pattern for the upper wiring 83 was formed on the device electrodes 2 and 3, and a Ti film having a thickness of 50 Å and an Au film having a thickness of 5,000 Å were sequentially deposited by a vacuum deposition method. Unnecessary portions were lifted off to be removed, thereby forming the upper wiring 83 having a desired shape {FIG. 12E}.

Step—f

Figure 12F:
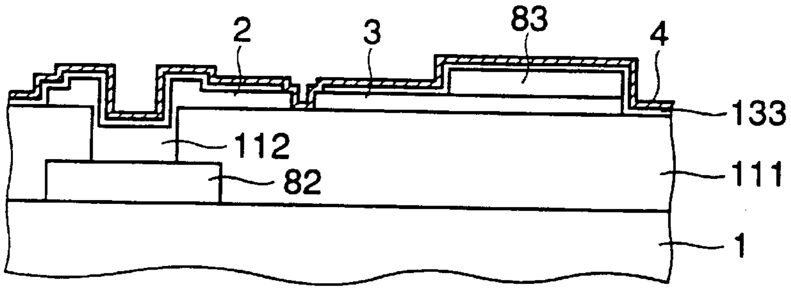

A mask having an opening at the inter-device-electrode gap L and therearound was formed, and a Cr film 133 having a thickness of 1,000 Å was deposited by a vacuum deposition method and patterned using the mask. The metal-amino-acid complex (aqueous PAla solution) used in Example 17 was applied to a portion between the device electrodes 2 and 3 by using a BJ ink-jet device, and the resultant structure was subjected to heating and decomposing treatments at 300° C. for 10 minutes. The electroconductive thin film 4 formed as described above and constituted by fine particles consisting of Pd as a main device had a thickness of 100 Å and a sheet resistance of $5.1\times10^4$ Ω. The fine particle film described here is a film obtained by gathering a plurality of fine particles. This film is not only a film having a fine structure in which fine particles are respectively dispersed and arranged, but also a film having a fine structure in which fine particles are adjacent to each other or overlap (including an island shape). The particle diameter of the fine particle film indicates the diameter of each fine particle whose shape can be recognized in the above state {FIG. 12F}.

Step—g

Figure 12G:
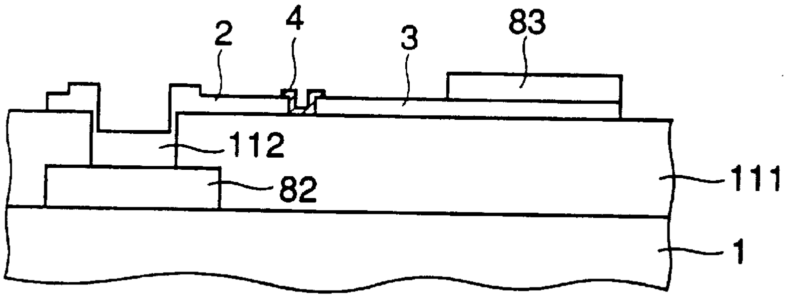

The Cr film 133 and an unnecessary portion of the electroconductive thin film 4 were etched by an acid etchant to form a desired pattern {FIG. 12G}.

Step—h

Figure 12H:
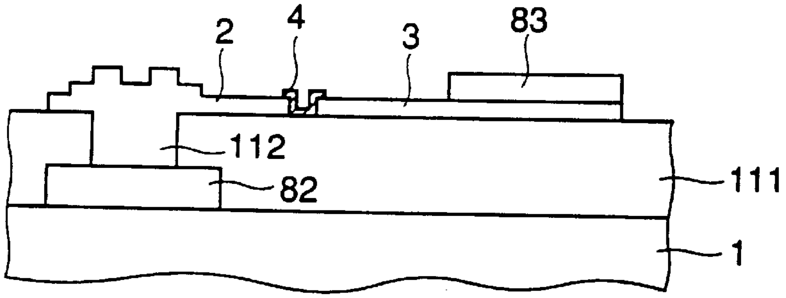

A pattern was formed to cover the resultant structure except for the contact hole 112 portion, and a Ti film having a thickness of 50 Å and an Au film having a thickness of 5,000 Å were sequentially deposited by a vacuum deposition method. Unnecessary portions were lifted off to be removed, thereby burying the contact hole 112 {FIG. 12H}.

With the above steps, the lower wiring 82, the insulating interlayer 111, the upper wiring 83, the device electrons 2 and 3, and the electroconductive thin film 4 were formed on the substrate 1.

An image forming apparatus was constituted by the electron source manufactured as described above. A method of manufacturing an image forming apparatus according to this example will be described below by using FIG. 9.

Figure 9:
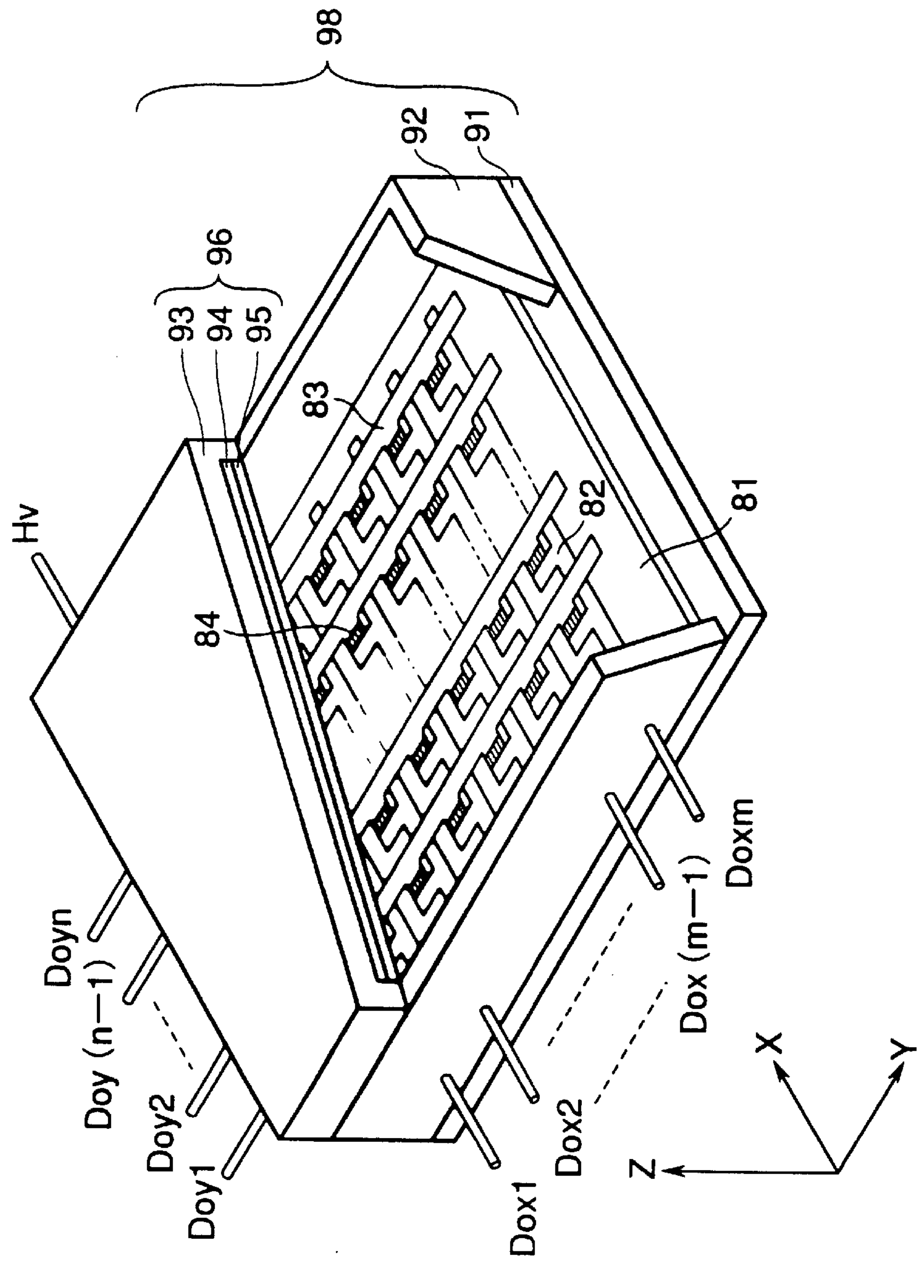
FIG. 9 is a schematic view showing an image forming apparatus in a simple matrix arrangement to which the present invention can be applied.

A substrate 81 on which a large number of planar type electrodes-emitting devices were formed as described above was fixed on a rear plate 91, and a face plate 96 (constituted by forming a phosphor film 94 and a metal back 95 on the internal surface of a glass substrate 93) was arranged through a support frame 92. Frit glass was coated on the Joint portions of the face plate 96, the support frame 92, and the rear plate 91, and these parts were heated at 400° C. to 500° C. in the air or in a nitrogen atmosphere for 10 minutes or more to be adhered to each other (FIG. 9). Frit glass was also used to fix the substrate 81 to the rear plate 91.

Referring to FIG. 9, reference numeral 84 denotes an electron-emitting device; 82 and 83 denote X- and Y-direction wirings, respectively.

Although the phosphor film 94 consisted of only a phosphor, a stripe-shaped phosphor was employed in this example. More specifically, black stripes were formed first, phosphors of respective colors were coated on the gap portions of the black stripes, thereby forming the phosphor film 94. As a material of the black stripes, a popular material containing graphite as a main component was used. As a method of coating a phosphor on the glass substrate 93, a slurry method was used.

The metal back 95 was generally formed on the internal surface side of the phosphor film 94. The metal back was formed by the following method. That is, a phosphor film was formed, a smoothing process was performed to the internal surface of the phosphor film 94, and then, Al was deposited on the internal surface in a vacuum state.

A transparent electrode (not shown) may be arranged on the face plate 96 on the external surface side of the phosphor film 94 to increase the conductivity of the phosphor film 94. However, since sufficient conductivity could be obtained by only the metal back 95, the transparent electrode was omitted.

In the above adhering operation, since a phosphor of each color had to correspond to an electron-emitting device in a color image forming apparatus, sufficient positioning was performed.

An atmospheric gas in the glass vessel (envelope) completed as described above was evacuated by an exhaust pump through an exhaust pipe (not shown) to obtain a sufficient degree of vacuum. Thereafter, a voltage was applied across the electrodes 2 and 3 of the electron-emitting device 84 through out-of-vessel terminals Dox1–Doxm and Doy1–Doyn, and a current conduction treatment (forming treatment) was applied to the electroconductive thin film 4 to form an electron emission portion 5. The voltage waveform of the forming treatment is shown in FIG. 4A.

Referring to FIG. 4A, reference symbols T1 and T2 denote the pulse width and pulse interval of the voltage waveform, respectively. In this example, T1 and T2 were set to 1 ms and 10 ms, respectively, the peak value (peak voltage in forming treatment) of a triangular wave was set to 5 V, and the forming treatment was performed in a vacuum atmosphere of about $1\times10^{-6}$ Torr.

The electron emission portion 5 formed as described above had a state in which fine particles containing palladium as a main component were dispersed and arranged, and the average particle size of the fine particles was 30 Å.

The envelope was kept at a degree of vacuum of about $1\times10^{-6}$ Torr, and an exhaust pipe was welded to the envelope such that the exhaust pipe was heated by a gas burner, thereby sealing the envelope.

Finally, a getter treatment was performed to maintain the degree of vacuum after sealing. In this treatment, a getter arranged at a predetermined position (not shown) in the image forming apparatus was heated by a heating method such as a high-frequency heating method immediately before sealing to perform a process for forming a deposition film. As the getter, a getter containing Ba or the like as a main component was used.

An image forming apparatus was formed as described above (drive circuit is not shown), a scanning signal and a modulation signal from a signal generation means (not shown) were applied to the electron-emitting devices through the out-of-vessel terminals Dox1–Doxm and Doy1–Doyn, respectively, to cause the electron-emitting devices to emit electrons. A high voltage of several kV or more was applied to the metal back 95 through a high-voltage terminal Hv to accelerate electron beams. The electron beams collided with the phosphor film 94 to excite the phosphor film 94 and cause the phosphor film 94 to emit light, thereby displaying an image.

To know the characteristics of the planar type electron-emitting device manufactured in the above steps, a standard electron-emitting device sample having the same electrode gap, electrode width, thin film width, and the like as those of the planar electron-emitting device shown in FIGS. 1A and 1B were simultaneously manufactured, and the electron emission characteristics of the standard electron-emitting device were measured by using the measurement evaluation apparatus shown in FIG. 3. The measurement conditions of the sample were set as follows: distance between the anode electrode and an electron-emitting device is set to 4 mm; the potential of the anode electrode was set to 1 kV; and a degree of vacuum in the vacuum device in measurement of the electron emission characteristics was set to $1\times10^{-6}$ Torr.

A device voltage was applied across the device electrodes 2 and 3, a device current If and an emission current Ie flowing at this time were measured. In this case, current-voltage characteristics shown in FIG. 5 were obtained. In an device obtained in this example, the emission current Ie sharply increased from an device voltage of about 8 V, the average device current If and the emission current Ie were 2.2 mA and 1.1 $\mu$A, respectively, at a device voltage of 16 V, and an electron emission efficiency $\eta$=Ie/If (%) was 0.05%.

EXAMPLE 140

In the same manner as in Example 29, metal compound solution droplets were applied by a BJ ink-jet device to opposing electrodes of a substrate on which a plurality of device electrodes and a matrix-like wiring were formed. The substrate was heated and then subjected to a forming treatment to obtain an electron source substrate.

A rear plate 91, a support frame 92, and a face plate 96 were connected to the electron source substrate and sealed in a vacuum state, thereby forming an image forming apparatus according to the schematic view in FIG. 9. A predetermined voltage was time-divisionally applied to the devices through terminals Dx1 to Dx16 and Dy1 to Dy16, and a high voltage was applied to a metal back through a terminal Hv, so that an arbitrary matrix image pattern could be displayed.

EXAMPLES 141–144

In the same manner as in Examples 30–33, metal compound solution droplets were applied by a BJ ink-jet device to opposing electrodes of substrates (FIG. 8) on which device electrodes and a matrix-like wiring used in Example 140 were formed. The substrate was heated and then subjected to a forming treatment to obtain electron source substrates. When the same treatment as in Example 140 was performed to the electron source substrates, the electron source substrates could display arbitrary matrix image patterns, respectively.

As has been described above, a metal composition for manufacturing an electron-emitting device according to the present invention has a water content required when an electroconductive thin film is formed by a BJ scheme, and does not easily produce a burnt matter on a heater when the electroconductive thin film is formed by the BJ scheme. When the electroconductive thin film is to be formed by the BJ scheme using this metal composition, a metal composition droplet can be stably discharged. For this reason, electroconductive thin films each having a uniform size can be formed in a long period of time. In particular, the metal composition is effectively used in the steps in forming a thin film for forming the electron emission portion of a surface conduction type electron-emitting device.

The metal composition for manufacturing an electron-emitting device according to the present invention is a metal composition which has good wettability to a substrate and a uniform thickness when the metal composition is coated on the substrate. When the metal composition is heated and decomposed, an electroconductive thin film having a uniform thickness can be formed. In particular, the metal composition is effectively used in the steps in forming a thin film for forming the electron emission portion of a surface conduction type electron-emitting device.

When the metal composition for manufacturing an electron-emitting device according to the present invention is coated on a substrate to have a pattern shape, a coating having a predetermined pattern can be obtained. An electroconductive thin film having a predetermined pattern and a uniform thickness can be formed by heating and decomposing the metal composition. Therefore, the steps in forming the electron emission portion of a surface conduction type electron-emitting device can be simplified, and an amount of metal material for forming the electron emission portion can be reduced.

According to a method of manufacturing an electron-emitting device using a metal composition for manufacturing an electron-emitting device of the present invention, an electron emission portion having an arbitrary shape and an arbitrary size can be simply formed, and an electron-emitting device can be freely designed.

Since a thin film for forming an electron emission portion is homogeneous, an electron-emitting device which uses the metal composition for manufacturing the electron-emitting device described above and has stable characteristics can be obtained at a low cost.

An image forming apparatus which uses the electron-emitting device and has stable characteristics can be obtained at a low cost.

Since the image forming apparatus has stable characteristics, it displays high quality images with a less more brightness.

What is claimed is:

1. An ink jet ink containing an organic metal complex compound including a metal element and an amino acid group, wherein said metal element is coordinated by the amino acid group.

2. An ink jet ink according to claim 1, wherein said amino acid group contains a hydroxyl group.

3. An ink jet ink according to claim 2, wherein said amino acid group is selected from the group consisting of serine, threonine and hydroxyproline.

4. An ink jet ink according to claim 1, wherein said amino acid group contains a heterocycle.

5. An ink jet ink according to claim 4, wherein said amino acid group is selected from the group consisting of proline, hydroxyproline and pipecolic acid.

6. An ink jet ink according to claim 1, wherein said metal element is selected from the group consisting of platinum, palladium, ruthenium, gold, silver, copper, chromium, tantalum, iron, tungsten, zinc, lead and tin.

7. An ink jet ink according to claim 1, wherein said metal element is a platinum group element.

8. An ink jet ink according to claim 7, wherein said platinum group element is palladium.

9. An ink jet ink according to claim 2, wherein the content of said metal element is within the range of 0.1 to 2.0 wt %.

10. An ink jet ink according to claim 1, wherein said ink further contains a partially esterified polyvinyl alcohol.

11. An ink jet ink according to claim 10, wherein the content of said partially esterified polyvinyl alcohol is within the range of 0.01 to 0.5 wt %.

12. An ink jet ink according to claim 10, wherein the esterification rate of the partially esterified polyvinyl alcohol is within the range of 5 to 25 mol %.

13. An ink jet ink according to claim 10, wherein the average degree of polymerization of said partially esterified polyvinyl alcohol is within the range of 450 to 1,200.

14. An ink jet ink according to claim 1, wherein said ink further contains a water-soluble polyhydric alcohol.

15. An ink jet ink according to claim 14, wherein the carbon number of said water-soluble polyhydric alcohol is 2 to 4.

16. An ink jet ink according to claim 14, wherein said water-soluble polyhydric alcohol is selected from the group consisting of ethylene glycol, propylene glycol and glycerine.

17. An ink jet ink according to claim 14, wherein the content of said water-soluble polyhydric alcohol is within the range of 0.2 to 3 wt %.

18. An ink jet ink according to claim 1, wherein said ink further contains a monohydric alcohol.

19. An ink jet ink according to claim 18, wherein the carbon number of said monohydric alcohol is 1 to 4 and said monohydric alcohol is in a liquid state at room temperature.

20. An ink jet ink according to claim 18, wherein said monohydric alcohol is selected from the group consisting of methanol, ethanol, 1-propanol, 2-propanol and 2-butanol.

21. An ink jet ink according to claim 18, wherein the content of said monohydric alcohol is within the range of 5 to 35 wt %.

22. An ink jet device provided with an ink jet ink containing an organic metal complex compound including a metal element and an amino acid group and a head for discharging the ink jet ink, wherein said metal element is coordinated by the amino acid group.

23. An ink jet device according to claim 22, wherein said amino acid group contains a hydroxyl group.

24. An ink jet device according to claim 22, wherein said metal element is selected from the group consisting of platinum, palladium, ruthenium, gold, silver, copper, chromium, tantalum, iron, tungsten, zinc, lead and tin.

25. An ink jet device according to claim 22, wherein said ink further contains a partially esterified polyvinyl alcohol.

26. An ink jet device according to claim 22, wherein said ink further contains a water-soluble polyhydric alcohol.

27. An ink jet device according to claim 22, wherein said ink further contains a monohydric alcohol.

28. An ink jet ink containing an organic metal complex compound including a metal element and an amino acid group, wherein said metal element is a platinum group element.

29. An ink jet ink containing an organic metal complex compound including a metal element and an amino acid group, wherein said metal element is a platinum group element, and said platinum group element is palladium.

30. An ink jet ink containing an organic metal complex compound including a metal element and an amino acid group, wherein said ink further contains a partially esterified polyvinyl alcohol, and the esterification rate of the partially esterified polyvinyl alcohol is within the range of 5 to 25 mol %.

31. An ink jet ink containing an organic metal complex compound including a metal element and an amino acid group, wherein said ink further contains a partially esterified polyvinyl alcohol, and the average degree of polymerization of said partially esterified polyvinyl alcohol is within the range of 450 to 1,200.

* * * * *

UNITED STATES PATENT AND TRADEMARK OFFICE

CERTIFICATE OF CORRECTION

PATENT NO. : 6,221,140 B1 
DATED : April 24, 2001
INVENTOR(S) : Shin Kobayashi et al.

It is certified that error appears in the above-identified patent and that said Letters Patent is hereby corrected as shown below:

Column 1
Line 27, "an" should read -- a --;
Line 29, ""PHYSICAL" should read -- "Physical --;
Line 33, "device" should read -- a device --; and
Line 57, "(1983)," should read -- (1983)], --.

Column 4
Line 48, "is" should read -- are --.

Column 6
Lines 33 and 44, "solved" should read -- dissolved --; and
Line 56, "that" should read -- to which --.

Column 8
Line 11, "and" should be deleted; and
Line 20, "then" should read -- than --.

Column 9
Line 59, "electron" should read -- electron- --.

Column 11
Line 42, "follows;" should read -- follows: --.

Column 12
Line 2, "follows;" should read -- follows: --.

Column 13
Lines 34, 59 and 61 "an" should read -- a --.

Column 14
Line 63, "An" should read -- A --.

UNITED STATES PATENT AND TRADEMARK OFFICE
CERTIFICATE OF CORRECTION

PATENT NO. : 6,221,140 B1 
DATED : April 24, 2001
INVENTOR(S) : Shin Kobayashi et al.

It is certified that error appears in the above-identified patent and that said Letters Patent is hereby corrected as shown below:

Column 15
Line 10, "changes" should read -- changed --;
Line 28, "prepared" should read -- were prepared --;
Line 29, "of." should read -- of --;
Lines 48 and 49, "an" should read -- a --; and
Line 49, "a" (both occurrences) should read -- an --.

Column 16
Line 15, "the 100 devices of" should be deleted; and
Line 40, "19-3" should read -- 19-3. --.

Column 17
Line 50, "a" (2nd occurrence) should read -- an --; and
Line 51, "an" should read -- a --.

Column 18
Line 50, "follows;" should read -- follows: --.

Column 19
Lines 30 and 55, "follows;" should read -- follows: --.

Column 20
Lines 18 and 42, "follows;" should read -- follows: --.

Column 21
Lines 6, 36 and 67, "follows;" should read -- follows: --.

Column 22
Lines 29 and 59, "follows;" should read -- follows: --.

Column 24
Line 50, "Joint" should read -- joint --.

UNITED STATES PATENT AND TRADEMARK OFFICE

CERTIFICATE OF CORRECTION

PATENT NO. : 6,221,140 B1
DATED : April 24, 2001
INVENTOR(S) : Shin Kobayashi et al.

It is certified that error appears in the above-identified patent and that said Letters Patent is hereby corrected as shown below:

Column 26
Line 5, "follows;" should read -- follows: --; and "distance" should read -- the distance --;
Line 6, "is" should read -- was --; and
Lines 13 and 15, "an" should read -- a --.

Column 27
Line 33, "less" should be deleted; and
Line 34, "more" should read -- more uniform --.

Signed and Sealed this

First Day of October, 2002

Attest:

JAMES E. ROGAN

*Attesting Officer* *Director of the United States Patent and Trademark Office*